US010358911B2

(12) United States Patent
Wu et al.

(10) Patent No.: US 10,358,911 B2
(45) Date of Patent: Jul. 23, 2019

(54) TILTED ANTENNA LOGGING SYSTEMS AND METHODS YIELDING ROBUST MEASUREMENT SIGNALS

(75) Inventors: Hsu-Hsiang Wu, Sugarland, TX (US); Burkay Donderici, Houston, TX (US); Michael S. Bittar, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 671 days.

(21) Appl. No.: 14/410,544

(22) PCT Filed: Jun. 25, 2012

(86) PCT No.: PCT/US2012/043943
§ 371 (c)(1),
(2), (4) Date: Dec. 22, 2014

(87) PCT Pub. No.: WO2014/003702
PCT Pub. Date: Jan. 3, 2014

(65) Prior Publication Data
US 2015/0322774 A1    Nov. 12, 2015

(51) Int. Cl.
*E21B 47/09* (2012.01)
*G01V 3/28* (2006.01)
(Continued)

(52) U.S. Cl.
CPC ............. *E21B 47/09* (2013.01); *G01B 5/004* (2013.01); *G01B 7/004* (2013.01); *G01V 3/28* (2013.01); *G01V 3/38* (2013.01)

(58) Field of Classification Search
None
See application file for complete search history.

(56) References Cited

U.S. PATENT DOCUMENTS 2,884,590 A  *  4/1959  Welz .................... G01V 3/24
                                                324/373
2,901,689 A     8/1959  Barrett
                     (Continued)

FOREIGN PATENT DOCUMENTS

AU    2012383577    6/2012
AU    2011202215    5/2013
(Continued)

OTHER PUBLICATIONS

AU Patent Examination Report No. 1, dated Mar. 27, 2015, Appl No. 2012383577, "Tilted Antenna Logging Systems and Methods Yielding Robust Measurement Signals," Filed Jun. 25, 2015, 3 pgs.
(Continued)

*Primary Examiner* — Elias Desta
(74) *Attorney, Agent, or Firm* — Benjamin Fite; C. Tumey Law Group PLLC

(57) ABSTRACT

Disclosed herein are electromagnetic logging systems and methods that provide a set of signals that robustly approximate the response of a model tool employing orthogonal triads of point-dipole antennas. One illustrative method embodiment obtains an azimuthally sensitive electromagnetic logging tool's signal measurements as a function of position in a borehole, the tool having at least two spacing distances (d1, d2) between transmit and receive antennas. Orthogonal direct coupling measurements (Vxx, Vyy, Vzz) are derived from the signal measurements and converted into a set of robust signals, the set including: a ratio between Vzz coupling components at different spacing distances, a ratio between Vxx and Vzz coupling components, a ratio between Vyy and Vzz coupling components, and a ratio between Vxx and Vyy coupling components. The set may include an additional robust signal having a ratio between a
(Continued)

sum of cross-coupling components Vxz+Vzx or Vyz+Vzy and a sum of orthogonal direct coupling components.

18 Claims, 10 Drawing Sheets

(51) Int. Cl.
  *G01B 5/004* (2006.01)
  *G01B 7/004* (2006.01)
  *G01V 3/38* (2006.01)

(56) References Cited

U.S. PATENT DOCUMENTS

| | | | |
|---|---|---|---|
| 3,014,177 A | 12/1961 | Hungerford et al. | |
| 3,187,252 A | 6/1965 | Hungerford | |
| 3,406,766 A | 10/1968 | Henderson | |
| 3,408,561 A * | 10/1968 | Osborn | E21B 47/01 324/342 |
| 3,412,815 A | 11/1968 | Holser | |
| 3,510,757 A | 5/1970 | Huston | |
| 3,539,911 A | 11/1970 | Youmans et al. | |
| 3,561,007 A | 2/1971 | Gouilloud et al. | |
| 3,614,600 A | 10/1971 | Ronka et al. | |
| 3,808,520 A | 4/1974 | Runge | |
| 3,982,176 A | 9/1976 | Meador | |
| 4,072,200 A | 2/1978 | Morris et al. | |
| 4,104,596 A | 8/1978 | Smither | |
| 4,224,989 A | 9/1980 | Blount | |
| 4,258,321 A | 3/1981 | Neale | |
| 4,297,699 A | 10/1981 | Fowler et al. | |
| 4,302,722 A | 11/1981 | Gianzero | |
| 4,319,191 A | 3/1982 | Meador et al. | |
| 4,360,777 A | 11/1982 | Segesman | |
| 4,430,653 A | 2/1984 | Coon et al. | |
| 4,443,762 A | 4/1984 | Kuckes | |
| 4,458,767 A | 7/1984 | Hoehn, Jr. | |
| 4,472,684 A | 9/1984 | Schuster | |
| 4,502,010 A | 2/1985 | Kuckes | |
| 4,504,833 A | 3/1985 | Fowler et al. | |
| 4,536,714 A | 8/1985 | Clark | |
| 4,553,097 A | 11/1985 | Clark | |
| 4,593,770 A | 6/1986 | Hoehn, Jr. | |
| 4,605,268 A | 8/1986 | Meador | |
| 4,611,173 A | 9/1986 | Bravenec et al. | |
| 4,636,731 A | 1/1987 | Savage et al. | |
| 4,651,101 A | 3/1987 | Barber et al. | |
| 4,670,717 A | 6/1987 | Sender | |
| 4,697,190 A | 9/1987 | Oswald | |
| 4,700,142 A | 10/1987 | Kuckes | |
| 4,780,857 A | 10/1988 | Lyle et al. | |
| 4,785,247 A | 11/1988 | Meador et al. | |
| 4,791,373 A | 12/1988 | Kuckes | |
| 4,808,929 A | 2/1989 | Oldigs | |
| 4,814,768 A | 3/1989 | Chang | |
| RE32,913 E | 4/1989 | Clark | |
| 4,825,421 A | 4/1989 | Jeter | |
| 4,829,488 A | 5/1989 | Siegfried, II | |
| 4,845,433 A | 7/1989 | Kleinberg | |
| 4,845,434 A | 7/1989 | Kuckes et al. | |
| 4,873,488 A | 10/1989 | Barber et al. | |
| 4,875,014 A | 10/1989 | Roberts et al. | |
| 4,899,112 A | 2/1990 | Clark et al. | |
| 4,909,336 A | 3/1990 | Brown et al. | |
| 4,933,640 A | 6/1990 | Kuckes | |
| 4,940,943 A | 7/1990 | Bartel et al. | |
| 4,945,987 A | 8/1990 | Wittrisch | |
| 4,949,045 A | 8/1990 | Clark et al. | |
| 4,962,490 A | 10/1990 | Lyle et al. | |
| 4,968,940 A | 11/1990 | Clark et al. | |
| 4,980,643 A | 12/1990 | Gianzero et al. | |
| 5,089,779 A | 2/1992 | Rorden | |
| 5,113,192 A | 5/1992 | Thomas | |
| 5,115,198 A | 5/1992 | Gianzero et al. | |
| 5,133,418 A | 7/1992 | Gibson et al. | |
| 5,138,313 A | 8/1992 | Barrington | |
| 5,155,198 A | 10/1992 | Keohan | |
| 5,200,705 A | 4/1993 | Clark et al. | |
| 5,210,495 A | 5/1993 | Hapashey et al. | |
| 5,230,386 A | 7/1993 | Wu et al. | |
| 5,230,387 A | 7/1993 | Waters et al. | |
| 5,239,448 A | 8/1993 | Perkins et al. | |
| 5,241,273 A | 8/1993 | Luling | |
| 5,243,290 A | 9/1993 | Safinya | |
| 5,248,975 A | 9/1993 | Schutz | |
| 5,260,662 A | 11/1993 | Rorden | |
| 5,278,507 A | 1/1994 | Bartel et al. | |
| 5,318,123 A | 6/1994 | Venditto et al. | |
| 5,329,448 A | 7/1994 | Rosthal | |
| 5,332,048 A | 7/1994 | Underwood et al. | |
| 5,339,036 A | 8/1994 | Clark et al. | |
| 5,343,152 A | 8/1994 | Kuckes | |
| 5,357,253 A | 10/1994 | Van Etten et al. | |
| 5,358,050 A | 10/1994 | Schmidt | |
| 5,377,104 A | 12/1994 | Sorrells et al. | |
| 5,389,881 A | 2/1995 | Bittar et al. | |
| 5,400,030 A | 3/1995 | Duren et al. | |
| 5,402,068 A | 3/1995 | Meador et al. | |
| 5,420,589 A | 5/1995 | Wells et al. | |
| 5,424,293 A | 6/1995 | Sinclair et al. | |
| 5,442,294 A | 8/1995 | Rorden | |
| 5,485,089 A | 1/1996 | Kuckes | |
| 5,503,225 A | 4/1996 | Withers | |
| 5,508,616 A | 4/1996 | Sato et al. | |
| 5,530,358 A | 6/1996 | Wisler et al. | |
| 5,530,359 A | 6/1996 | Habashy et al. | |
| 5,541,517 A | 7/1996 | Hartmann | |
| 5,550,473 A | 8/1996 | Klein | |
| 5,552,786 A | 9/1996 | Xia et al. | |
| 5,563,512 A | 10/1996 | Mumby | |
| 5,589,775 A | 12/1996 | Kuckes | |
| 5,594,343 A | 1/1997 | Clark et al. | |
| 5,631,562 A | 5/1997 | Cram et al. | |
| 5,656,930 A | 8/1997 | Hagiwara | |
| 5,676,212 A | 10/1997 | Kuckes | |
| 5,720,355 A | 2/1998 | Lamine et al. | |
| 5,725,059 A | 3/1998 | Kuckes et al. | |
| 5,747,750 A | 5/1998 | Bailey et al. | |
| 5,757,191 A | 5/1998 | Gianzero | |
| 5,765,642 A | 6/1998 | Surjaatmadja | |
| 5,781,436 A | 7/1998 | Forgang et al. | |
| 5,854,991 A | 12/1998 | Gupta et al. | |
| 5,886,526 A | 3/1999 | Wu | |
| 5,892,460 A | 4/1999 | Jerabek et al. | |
| 5,900,833 A | 5/1999 | Sunlin et al. | |
| 5,917,160 A | 6/1999 | Bailey | |
| 5,923,170 A | 7/1999 | Kuckes | |
| 5,999,883 A | 12/1999 | Gupta et al. | |
| 6,044,325 A | 3/2000 | Chakravarthy et al. | |
| 6,084,826 A | 7/2000 | Leggett, III | |
| 6,098,727 A | 8/2000 | Ringgenberg et al. | |
| 6,100,839 A | 8/2000 | Heger et al. | |
| 6,147,496 A | 11/2000 | Strack et al. | |
| 6,158,532 A | 12/2000 | Logan et al. | |
| 6,163,155 A | 12/2000 | Bittar | |
| 6,181,138 B1 | 1/2001 | Hagiwara et al. | |
| 6,191,586 B1 | 2/2001 | Bittar | |
| 6,191,588 B1 | 2/2001 | Chen | |
| 6,206,108 B1 | 3/2001 | MacDonald et al. | |
| 6,216,783 B1 | 4/2001 | Hocking et al. | |
| 6,218,841 B1 | 4/2001 | Wu | |
| 6,218,842 B1 | 4/2001 | Bittar | |
| 6,257,334 B1 | 7/2001 | Cyr | |
| 6,297,639 B1 | 10/2001 | Clark et al. | |
| 6,304,086 B1 | 10/2001 | Minerbo et al. | |
| 6,351,127 B1 | 2/2002 | Rosthal et al. | |
| 6,353,321 B1 | 3/2002 | Bittar | |
| 6,359,438 B1 | 3/2002 | Bittar | |
| 6,373,254 B1 | 4/2002 | Dion et al. | |
| 6,389,438 B1 | 5/2002 | Zhou | |
| 6,405,136 B1 | 6/2002 | Li et al. | |
| 6,435,286 B1 | 8/2002 | Stump et al. | |
| 6,460,936 B1 | 10/2002 | Abramov et al. | |
| 6,466,020 B2 | 10/2002 | Kuckes et al. | |

(56) References Cited

U.S. PATENT DOCUMENTS

| | | | |
|---|---|---|---|
| 6,476,609 B1 | 11/2002 | Bittar | |
| 6,491,115 B2 | 12/2002 | Van Houwelingen et al. | |
| 6,496,137 B1 | 12/2002 | Johansson | |
| 6,508,316 B2 | 1/2003 | Estes et al. | |
| 6,538,447 B2 | 3/2003 | Bittar | |
| 6,541,979 B2 | 4/2003 | Omeragic | |
| 6,557,650 B2 | 5/2003 | Fayard et al. | |
| 6,566,881 B2 | 5/2003 | Omeragic et al. | |
| 6,573,722 B2 | 6/2003 | Rosthal et al. | |
| 6,584,837 B2 | 7/2003 | Kurkoski | |
| 6,614,229 B1 | 9/2003 | Clark et al. | |
| 6,630,831 B2 | 10/2003 | Amini | |
| 6,633,252 B2 | 10/2003 | Stolarczyk et al. | |
| 6,646,441 B2 | 11/2003 | Thompson et al. | |
| 6,651,739 B2 | 11/2003 | Arndt et al. | |
| 6,672,409 B1 | 1/2004 | Dock et al. | |
| 6,691,036 B2 | 2/2004 | Blanch et al. | |
| 6,710,600 B1 | 3/2004 | Kopecki et al. | |
| 6,712,140 B2 | 3/2004 | Van Oers et al. | |
| 6,727,706 B2 | 4/2004 | Gao et al. | |
| 6,736,222 B2 | 5/2004 | Kuckes et al. | |
| 6,755,263 B2 | 6/2004 | Alft et al. | |
| 6,765,385 B2 | 7/2004 | Sinclair et al. | |
| 6,771,206 B2 | 8/2004 | Berthelier et al. | |
| 6,777,940 B2 | 8/2004 | Macune | |
| 6,778,127 B2 | 8/2004 | Stolarczyik et al. | |
| 6,788,065 B1 | 9/2004 | Homan et al. | |
| 6,810,331 B2 | 10/2004 | Bittar et al. | |
| 6,856,132 B2 | 2/2005 | Appel | |
| 6,863,127 B2 | 3/2005 | Clark et al. | |
| 6,885,943 B2 | 4/2005 | Bittar et al. | |
| 6,900,640 B2 | 5/2005 | Fanini et al. | |
| 6,911,824 B2 | 6/2005 | Bittar | |
| 6,925,031 B2 | 8/2005 | Kriegshauser et al. | |
| 6,934,635 B2 | 8/2005 | Kennedy | |
| 6,940,446 B2 | 9/2005 | Cist | |
| 6,943,709 B2 | 9/2005 | Blanch et al. | |
| 6,944,546 B2 | 9/2005 | Xiao et al. | |
| 6,958,610 B2 | 10/2005 | Gianzero | |
| 6,961,663 B2 | 11/2005 | Sinclair et al. | |
| 6,985,814 B2 | 1/2006 | McElhinney | |
| 7,013,991 B2 | 3/2006 | Wilson-Langman et al. | |
| 7,019,528 B2 | 3/2006 | Bittar | |
| 7,038,455 B2 | 5/2006 | Beste et al. | |
| 7,046,009 B2 | 5/2006 | Itskovich | |
| 7,046,010 B2 | 5/2006 | Hu et al. | |
| 7,062,072 B2 | 6/2006 | Anxionnaz et al. | |
| 7,098,664 B2 | 8/2006 | Bittar et al. | |
| 7,098,858 B2 | 8/2006 | Bittar et al. | |
| 7,123,016 B2 | 10/2006 | Larsen | |
| 7,133,779 B2 | 11/2006 | Tilke et al. | |
| 7,138,803 B2 | 11/2006 | Bittar | |
| 7,143,844 B2 | 12/2006 | Alft et al. | |
| 7,171,310 B2 | 1/2007 | Haugland | |
| 7,202,670 B2 | 4/2007 | Omeragic et al. | |
| 7,227,363 B2 | 6/2007 | Gianzero et al. | |
| 7,265,552 B2 | 9/2007 | Bittar | |
| 7,268,019 B2 | 9/2007 | Golla et al. | |
| 7,296,462 B2 | 11/2007 | Gregory et al. | |
| 7,301,223 B2 | 11/2007 | Rodney et al. | |
| 7,306,056 B2 | 12/2007 | Ballantyne et al. | |
| 7,313,479 B2 | 12/2007 | Frenkel | |
| 7,336,222 B2 | 2/2008 | Praskovsky et al. | |
| 7,345,487 B2 | 3/2008 | Bittar et al. | |
| 7,350,568 B2 | 4/2008 | Mandal et al. | |
| 7,382,135 B2 | 6/2008 | Li et al. | |
| 7,394,257 B2 | 7/2008 | Martinez et al. | |
| 7,425,830 B2 | 9/2008 | Banning et al. | |
| 7,425,831 B2 | 9/2008 | Banning et al. | |
| 7,427,862 B2 | 9/2008 | Dashevsky et al. | |
| 7,427,863 B2 | 9/2008 | Bittar | |
| 7,477,162 B2 | 1/2009 | Clark | |
| 7,503,404 B2 | 3/2009 | McDaniel et al. | |
| 7,557,579 B2 | 7/2009 | Bittar | |
| 7,557,580 B2 | 7/2009 | Bittar | |
| 7,609,065 B2 | 10/2009 | Banning et al. | |
| 7,612,565 B2 | 11/2009 | Seydoux et al. | |
| 7,657,377 B2 | 2/2010 | Sinclair et al. | |
| 7,676,326 B2* | 3/2010 | Podladchikov | G01V 1/28 166/244.1 |
| 7,686,099 B2 | 3/2010 | Rodney et al. | |
| 7,739,049 B2 | 6/2010 | Market et al. | |
| 7,746,078 B2 | 6/2010 | Bittar et al. | |
| 7,755,361 B2 | 7/2010 | Seydoux et al. | |
| 7,775,276 B2 | 8/2010 | Pelletier et al. | |
| 7,786,733 B2 | 8/2010 | Seydoux et al. | |
| 7,812,610 B2 | 10/2010 | Clark et al. | |
| 7,825,664 B2 | 11/2010 | Homan et al. | |
| 7,839,148 B2 | 11/2010 | Vehra et al. | |
| 7,839,346 B2 | 11/2010 | Bittar et al. | |
| 7,848,887 B2 | 12/2010 | Yang et al. | |
| 7,912,648 B2 | 3/2011 | Tang et al. | |
| 7,924,013 B2 | 4/2011 | Seydoux et al. | |
| 7,948,238 B2 | 5/2011 | Bittar | |
| 7,982,464 B2 | 7/2011 | Bittar et al. | |
| 8,004,282 B2 | 8/2011 | Itskovich | |
| 8,016,053 B2 | 9/2011 | Menezes et al. | |
| 8,026,722 B2 | 9/2011 | McElhinney | |
| 8,030,937 B2 | 10/2011 | Hu et al. | |
| 8,085,049 B2 | 12/2011 | Bittar et al. | |
| 8,085,050 B2 | 12/2011 | Bittar et al. | |
| 8,096,355 B2 | 1/2012 | McDaniel et al. | |
| 8,159,227 B2 | 4/2012 | Wang | |
| 8,174,265 B2 | 5/2012 | Bittar et al. | |
| 8,244,473 B2* | 8/2012 | Radtke | G01V 11/00 702/11 |
| 8,274,289 B2 | 9/2012 | Bittar et al. | |
| 8,347,985 B2 | 1/2013 | Bittar et al. | |
| 8,378,908 B2 | 2/2013 | Wisler et al. | |
| 8,499,830 B2 | 8/2013 | Alberty | |
| 8,749,243 B2 | 6/2014 | Bittar et al. | |
| 8,917,094 B2 | 12/2014 | Bittar et al. | |
| 8,954,280 B2* | 2/2015 | Li | G01V 3/28 702/11 |
| 9,310,508 B2 | 4/2016 | Donderici et al. | |
| 9,364,905 B2* | 6/2016 | Hou | G01V 3/28 |
| 9,547,102 B2* | 1/2017 | Wu | G01V 3/38 |
| 9,753,175 B2* | 9/2017 | Li | G01V 3/30 |
| 9,791,586 B2* | 10/2017 | Bittar | E21B 47/026 |
| 2001/0022464 A1 | 9/2001 | Seear | |
| 2003/0023381 A1 | 1/2003 | San Martin | |
| 2003/0055565 A1 | 3/2003 | Omeragic | |
| 2003/0076107 A1 | 4/2003 | Fanini et al. | |
| 2003/0090424 A1 | 5/2003 | Brune et al. | |
| 2003/0229449 A1 | 12/2003 | Merchant et al. | |
| 2003/0229450 A1 | 12/2003 | Strickland | |
| 2004/0019427 A1 | 1/2004 | San Martin et al. | |
| 2004/0059514 A1 | 3/2004 | Bittar et al. | |
| 2004/0061622 A1 | 4/2004 | Clark | |
| 2004/0196047 A1 | 8/2004 | Fanini et al. | |
| 2005/0006090 A1 | 1/2005 | Chemali et al. | |
| 2005/0024060 A1 | 2/2005 | Bittar | |
| 2005/0211469 A1 | 9/2005 | Kuckes et al. | |
| 2005/0218898 A1 | 10/2005 | Fredette et al. | |
| 2006/0011385 A1 | 1/2006 | Seydoux et al. | |
| 2006/0015256 A1 | 1/2006 | Hassan et al. | |
| 2006/0038571 A1 | 2/2006 | Ostermeier et al. | |
| 2006/0054354 A1 | 3/2006 | Orban | |
| 2006/0102353 A1 | 5/2006 | Storm et al. | |
| 2006/0125479 A1 | 6/2006 | Chemali et al. | |
| 2007/0075455 A1 | 4/2007 | Marini et al. | |
| 2007/0075874 A1 | 4/2007 | Shah et al. | |
| 2007/0079989 A1 | 4/2007 | Bankston et al. | |
| 2007/0235225 A1 | 10/2007 | Bittar | |
| 2007/0278008 A1 | 12/2007 | Kuckes et al. | |
| 2008/0000686 A1 | 1/2008 | Kuckes et al. | |
| 2008/0002523 A1* | 1/2008 | Podladchikov | G01V 1/28 367/49 |
| 2008/0018895 A1 | 1/2008 | Opsal | |
| 2008/0143336 A1 | 6/2008 | Legendre et al. | |
| 2009/0037111 A1* | 2/2009 | Radtke | G01V 11/00 702/11 |
| 2009/0045973 A1 | 2/2009 | Rodney et al. | |
| 2009/0164127 A1 | 6/2009 | Clark | |

(56) References Cited

U.S. PATENT DOCUMENTS

| | | |
|---|---|---|
| 2009/0179647 A1 | 7/2009 | Wang et al. |
| 2009/0229826 A1 | 9/2009 | East, Jr. et al. |
| 2009/0278543 A1 | 11/2009 | Beste et al. |
| 2009/0309600 A1 | 12/2009 | Seydoux et al. |
| 2009/0315563 A1 | 12/2009 | Fox et al. |
| 2010/0004866 A1 | 1/2010 | Rabinovich et al. |
| 2010/0012377 A1 | 1/2010 | Sharp et al. |
| 2010/0082255 A1 | 4/2010 | Davydycheva et al. |
| 2010/0117655 A1 | 5/2010 | Bittar |
| 2010/0127708 A1 | 5/2010 | Bittar |
| 2010/0262370 A1 | 10/2010 | Bittar et al. |
| 2010/0284250 A1 | 11/2010 | Cornish et al. |
| 2011/0006773 A1 | 1/2011 | Bittar |
| 2011/0019501 A1 | 1/2011 | Market |
| 2011/0175899 A1 | 7/2011 | Bittar et al. |
| 2011/0186290 A1 | 8/2011 | Roddy et al. |
| 2011/0187566 A1 | 8/2011 | Soenen et al. |
| 2011/0192592 A1 | 8/2011 | Roddy et al. |
| 2011/0199228 A1 | 8/2011 | Roddy et al. |
| 2011/0221442 A1 | 9/2011 | Maurer et al. |
| 2011/0221443 A1 | 9/2011 | Bittar et al. |
| 2011/0234230 A1 | 9/2011 | Bittar et al. |
| 2011/0251794 A1 | 10/2011 | Bittar et al. |
| 2011/0298461 A1 | 12/2011 | Bittar et al. |
| 2011/0308859 A1 | 12/2011 | Bittar et al. |
| 2011/0309833 A1 | 12/2011 | Yang |
| 2011/0309835 A1 | 12/2011 | Barber et al. |
| 2012/0001637 A1 | 1/2012 | Bittar et al. |
| 2012/0024600 A1 | 2/2012 | Bittar et al. |
| 2012/0025834 A1 | 2/2012 | Minerbo et al. |
| 2012/0133367 A1 | 5/2012 | Bittar et al. |
| 2012/0199394 A1* | 8/2012 | Bittar .................. G01V 3/28 175/45 |
| 2012/0283951 A1* | 11/2012 | Li ........................ G01V 3/28 702/7 |
| 2012/0283952 A1 | 11/2012 | Tang et al. |
| 2013/0073206 A1* | 3/2013 | Hou ..................... G01V 3/28 702/7 |
| 2013/0105224 A1 | 5/2013 | Donderici et al. |
| 2014/0032116 A1 | 1/2014 | Guner et al. |
| 2014/0191879 A1 | 7/2014 | Bittar et al. |
| 2015/0240629 A1* | 8/2015 | Wu ..................... G01V 3/28 702/11 |
| 2015/0355368 A1* | 12/2015 | Li ........................ G01V 3/28 324/339 |
| 2015/0369950 A1* | 12/2015 | Wu ..................... G01V 3/30 702/7 |
| 2016/0274263 A1* | 9/2016 | Hou ..................... G01V 3/28 |

FOREIGN PATENT DOCUMENTS

| | | |
|---|---|---|
| AU | 2011202518 | 5/2013 |
| CA | 2873718 A1 * | 1/2014 |
| EP | 2116871 | 11/2009 |
| EP | 1315984 | 1/2011 |
| EP | 1155343 | 3/2011 |
| EP | 2108981 | 5/2011 |
| EP | 2110687 | 8/2011 |
| WO | 2007/149106 | 12/2007 |
| WO | 2008/008346 | 1/2008 |
| WO | 2008/008386 | 1/2008 |
| WO | 2008/021868 | 2/2008 |
| WO | 2008/076130 | 6/2008 |
| WO | WO 2008/076130 A1 * | 6/2008 |
| WO | 2011/129828 | 10/2011 |
| WO | WO 2011/129828 A1 * | 10/2011 |
| WO | 2012/005737 | 1/2012 |
| WO | 2012/008965 | 1/2012 |
| WO | 2012/064342 | 5/2012 |
| WO | 2012/121697 | 9/2012 |
| WO | WO 2014/003701 A1 * | 1/2014 |
| WO | WO 2014/003702 A1 * | 1/2014 |

OTHER PUBLICATIONS

PCT International Search Report and Written Opinion, dated Sep. 20, 2012, Appl No. PCT/US2012/043943, "Tilted Antenna Logging Systems and Methods Yielding Robust Measurement Signals" filed Jun. 5, 2012, 12 pgs.

PCT International Preliminary Report on Patentability, dated Jun. 6, 2014, Appl No. PCT/US2012/043943, "Tilted Antenna Logging Systems and Methods Yielding Robust Measurement Signals" filed Jun. 5, 2012, 6 pgs.

Moran, J. H., et al., "Effects of Formation Anisotropy of Resistivity-Logging Measurements," Geophysics, vol. 44, No. 7, (Jul. 1979), p. 1266-1286, 21 Figs., 4 Tables.

Barriol, Yves et al., "The Pressures of Drilling and Production", Oilfield Review, Autumn 2005, pp. 22-41.

Bell, C. et al., "Navigating and Imaging in Complex Geology With Azimuthal Propagation Resistivity While Drilling", 2006 SPE Annual Technical Conference and Exhibition, SPE 102637, San Antonio, TX, USA, Sep. 24, 2006, pp. 1-14.

Bittar, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, Nov. 11, 2007, pp. 1-9.

Bittar, Michael S. et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, Oct. 6, 1991, pp. 1-8, plus 10 pgs of Figures.

Bittar, Michael S. et al., "Invasion Profiling with a Multiple Depth of Investigation, Electromagnetic Wave Resistivity Sensor", SPE 28425, 69th Annual Technical Conference and Exhibition of the SPE, New Orleans, LA, Sep. 25, 1994, pp. 1-12, plus 11 pgs of Figures.

Bittar, Michael S. et al., "The Effects of Rock Anisotropy on MWD Electromagnetic Wave Resistivity Sensors", SPWLA 35th Annual Logging Symposium, Jun. 19, 1994, 18 pgs.

Bonner, S. et al., "A New Generation of Electrode Resistivity Measurements for Formation Evaluation While Drilling", SPWLA 35th Annual Logging Symposium, Jun. 19, 1994, pp. 1-19.

Bonner, Steve et al., "Resistivity While Drilling—Images from the String", Oilfield Review, Spring 1996, pp. 4-19.

Callaghan, G., "HFSS Modeling of Cross-Coupling in Borehole Radar", The Institution of Electrical Engineers, printed and published by IEEE, 2002, pp. 217-221, Savoy Place, London WC2R 0BL, UK, pp. 217-221.

Chou, Lawrence et al., "Steering Toward Enhanced Production", Oilfield Review, Autumn 2006, pp. 54-63.

Clark, Brian et al., "A Dual Depth Resistivity Measurement for Fewd", SPWLA 29th Annual Logging Symposium, Jun. 1988, 25 pgs.

Clark, Brian et al., "Electromagnetic Propagation Logging While Drilling: Theory and Experiment", SPE Formation Evaluation, Sep. 1990, pp. 263-271.

Daniels, David J., "Surface-Penetrating Radar", Electronics & Communication Engineering Journal, Aug. 1996, pp. 165-182.

Hagiwara, T., "A New Method to Determine Horizontal-Resistivity in Anisotropic Formations Without Prior Knowledge of Relative Dip", 37th Annual SPWLA Logging Symposium, New Orleans, LA, Jun. 16, 1996, pp. 1-5 , plus 3 pgs of Figs.

Li, Qiming et al., "New Directional Electromagnetic Tool for Proactive Geosteering and Accurate Formation Evaluation While Drilling", SPWLA 46th Annual Logging Symposium, Jun. 26-29, 2005, p. 1-16, New Orleans, LA, USA.

Liu, Sixin et al., "Application of Borehole Radar for Subsurface Physical Measurement", Nanjing Institute of Geophysical Prospecting and Institute of Physics Publishing, J. Geophys. Eng. 1 (2004), pp. 221-227.

Liu, Sixin et al., "Electromagnetic Logging Technique Based on Borehole Radar", IEEE Transactions on Geoscience and Remote Sensing, vol. 40, No. 9, Sep. 2002, pp. 2083-2092.

(56) References Cited

OTHER PUBLICATIONS

Luling, Martin G. et al., "Processing and Modeling 2-MHz Resistivity Tools in Dipping, Laminated, Anisotropic Formations: SPWLA", SPWLA 35th Annual Logging Symposium, Paper QQ, Jun. 19-22, 1994, 1994, pp. 1-25.

Mack, S. G. et al., "MWD Tool Accurately Measures Four Resistivities", Oil & Gas Journal, May 25, 1992, pp. 1-5.

Mechetin, V. F. et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, Date Unkn, 17 pgs.

Meyer, W. H., "New Two Frequency Propagation Resistivity Tools", SPWLA 36th Annual Logging Symposium, Jun. 26-29, 1995, 12 pgs.

Moinfar, Ali et al., "Time-Lapse Variations of Multi-Component Electrical Resistivity Measurements Acquired in High-Angle Wells", Moinfar, Ali, et al., "Time-Lapse Variations of Multi-Component Electrical Resistivity Measurements Acquired in High-Angle Wells," Petrophysics, Dec. 2010, pp. 408-427, vol. 51, No. 6, 20 pgs.

Rodney, Paul F. et al., "Electromagnetic Wave Resistivity MWD Tool", SPE Drilling Engineering, Oct. 1986, p. 337-346.

Van Dongen, Koen W. et al., "A Directional Borehole Radar System", Subsurface Sensing Technologies and Applications, vol. 3, No. 4, Oct. 2002, Delft University of Technology, Delft, The Netherlands, pp. 327-346.

Zhu, Tianfei et al., "Two Dimensional Velocity Inversion and Synthetic Seismogram Computation", Geophysics, vol. 52, No. 1, Jan. 1987, pp. 37-49.

* cited by examiner

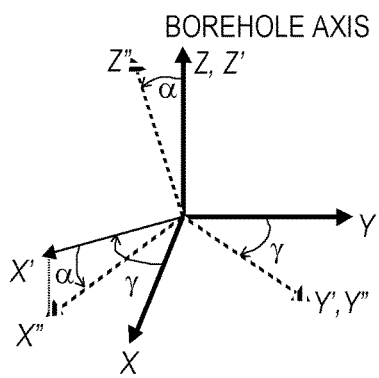
FIG. 3
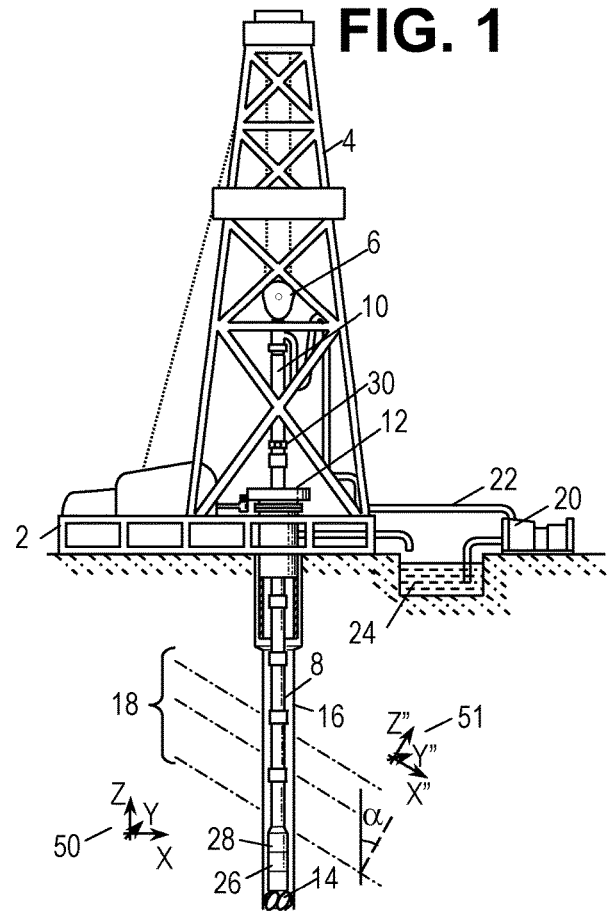
FIG. 1
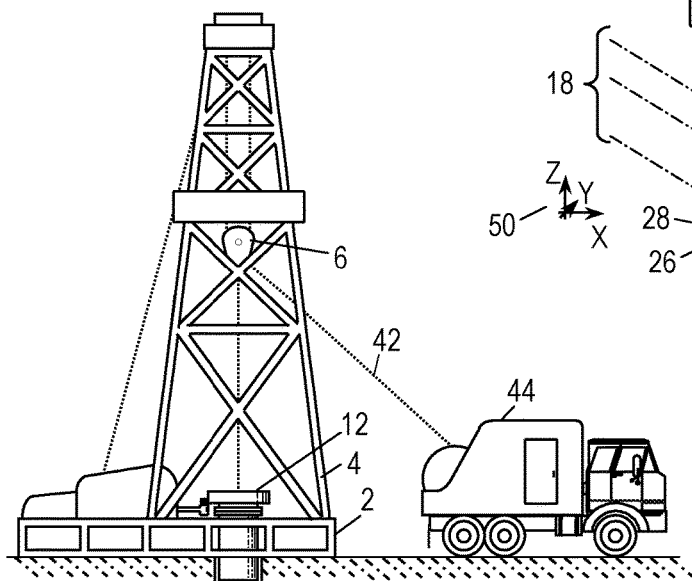
FIG. 2
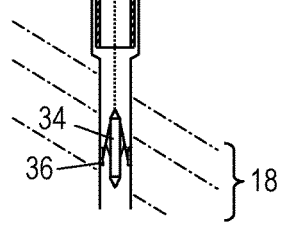

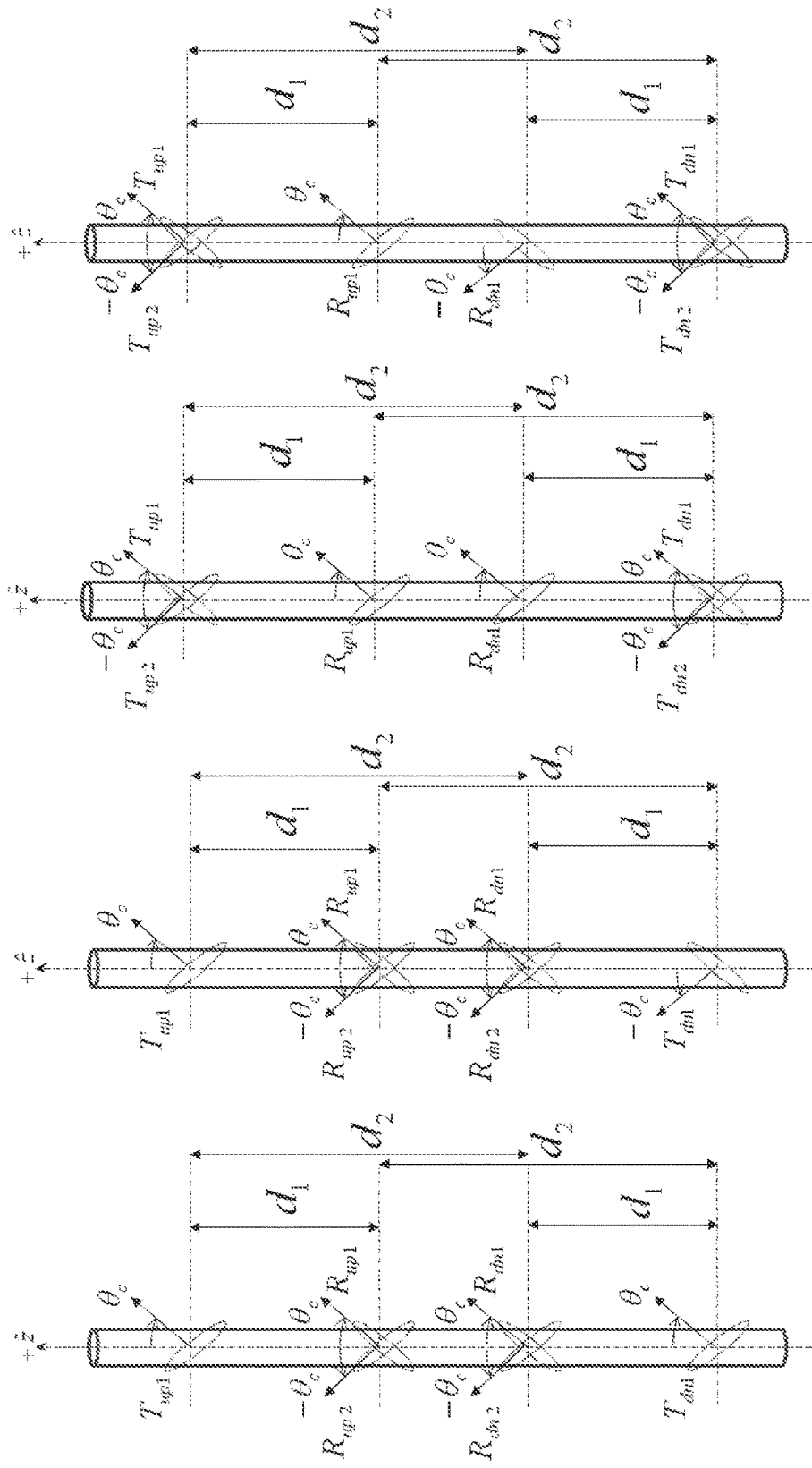

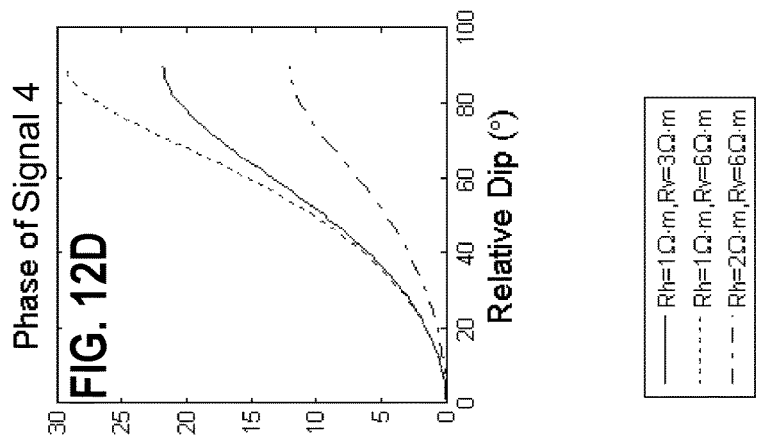
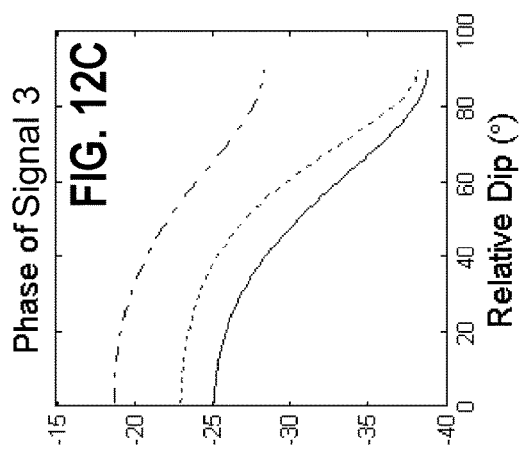
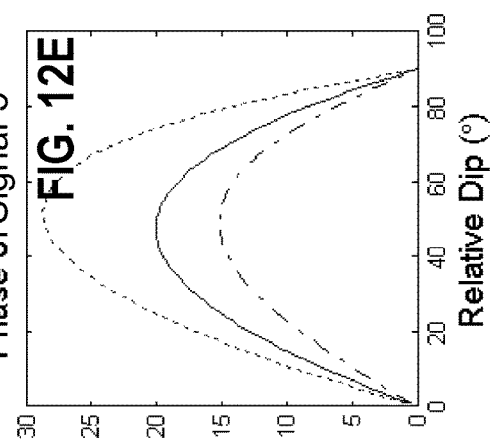
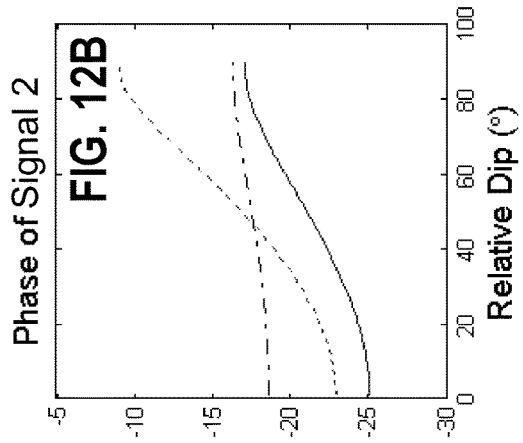
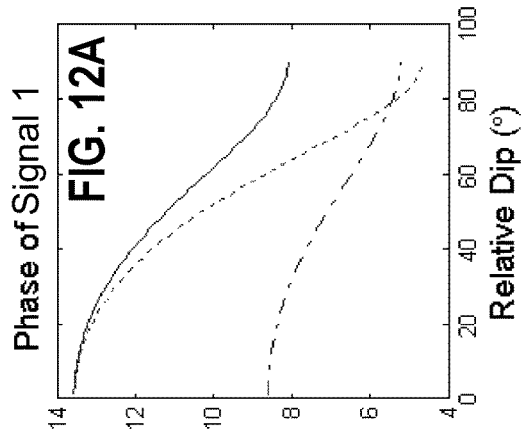

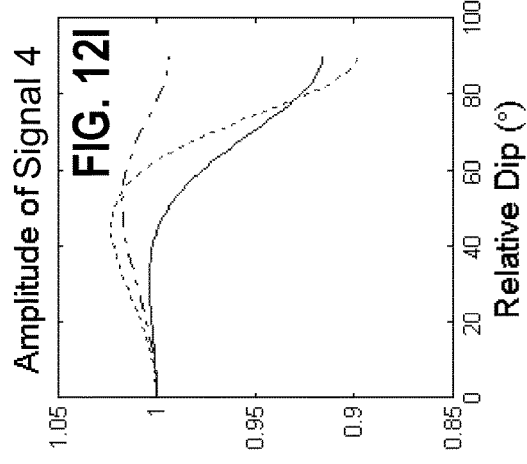
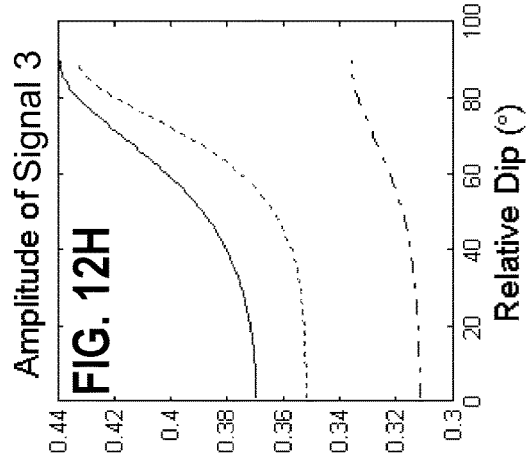
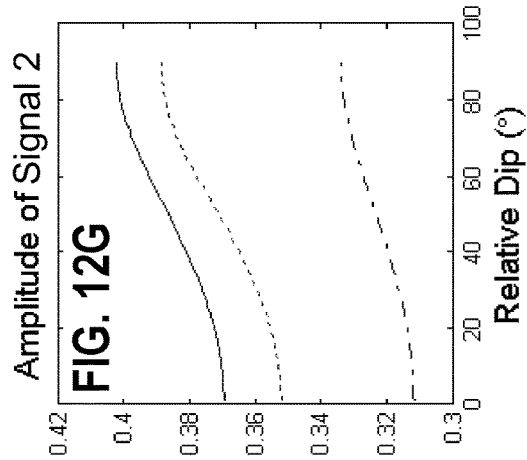
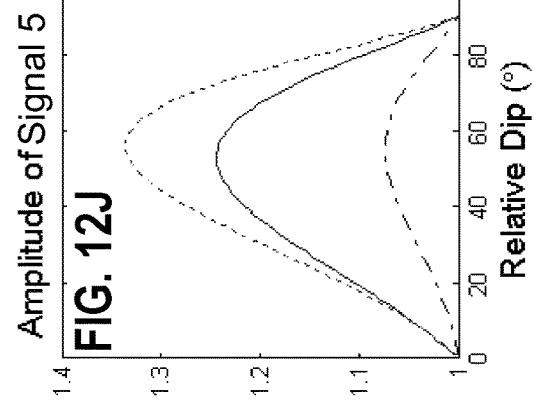
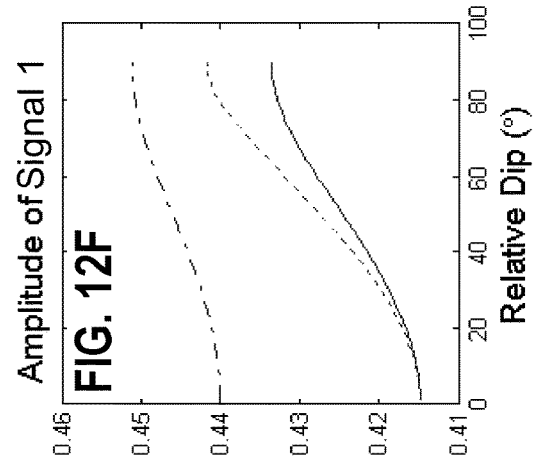

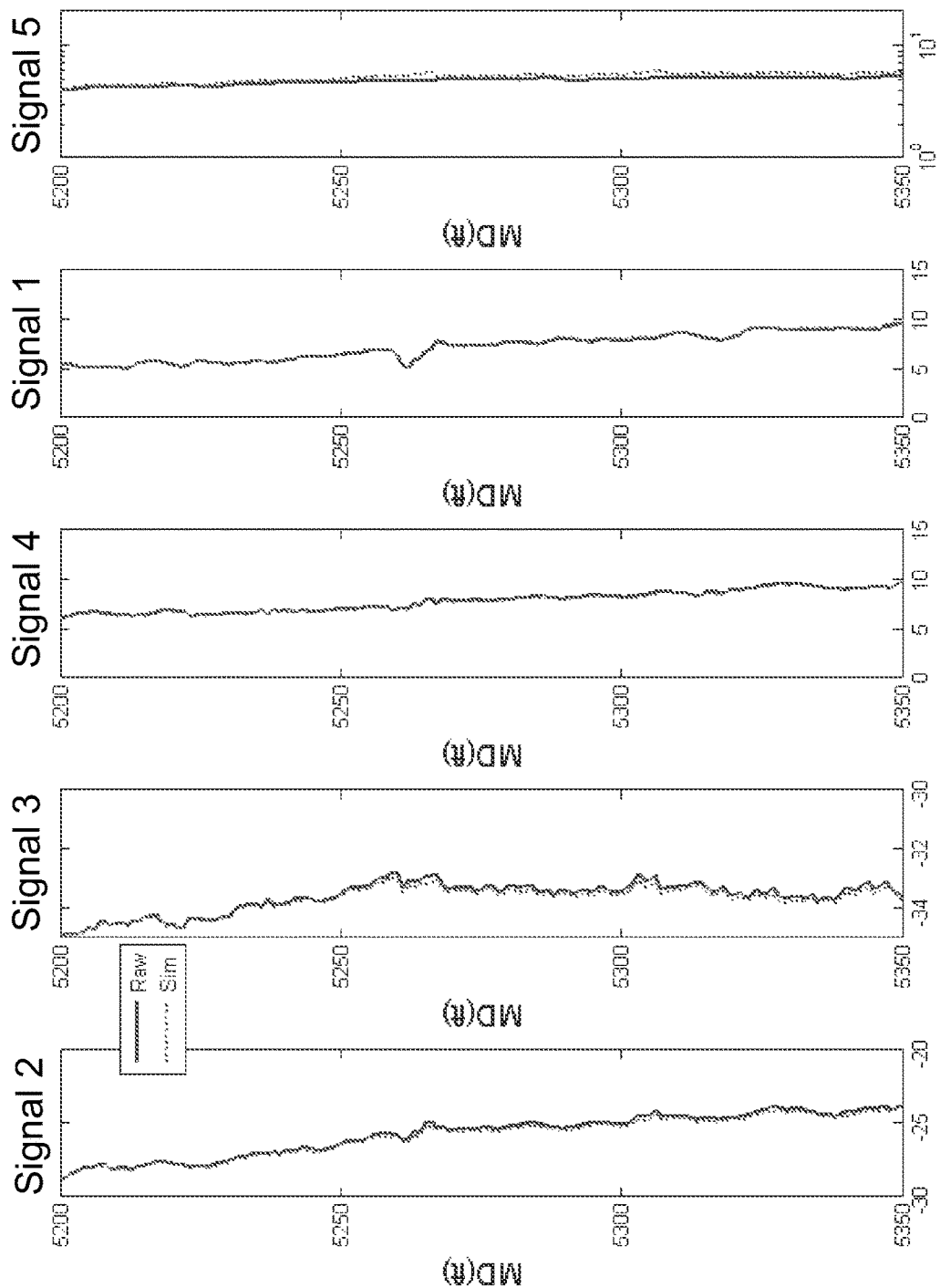

TILTED ANTENNA LOGGING SYSTEMS AND METHODS YIELDING ROBUST MEASUREMENT SIGNALS

BACKGROUND

The basic principles and techniques for electromagnetic logging for earth formations are well known. For example, induction logging to determine the resistivity (or its inverse, conductivity) of earth formations adjacent a borehole has long been a standard and important technique in the search for and recovery of subterranean petroleum deposits. In brief, a transmitter transmits an electromagnetic signal that passes through formation materials around the borehole and induces a signal in ore or more receivers. The amplitude and/or phase of the receiver signals are influenced by the formation resistivity, enabling resistivity measurements to be made. The measured signal characteristics and/or formation properties calculated therefrom are recorded as a function of the tool's depth or position in the borehole, yielding a formation log that can be used by analysts.

Note, however, that the resistivity of a given formation may be isotropic (equal in all directions) or anisotropic (unequal in different directions). In electrically anisotropic formations, the anisotropy is generally attributable to fine layering during the sedimentary build-up of the formation. Hence, in a formation coordinate system oriented such that the x-y plane is parallel to the formation layers and the z axis is perpendicular to the formation layers, resistivities $R_X$ and $R_Y$ in directions x and y, respectively, tend to be the same, but resistivity $R_Z$ in the z direction is different. Thus, the resistivity in a direction parallel to the plane of the formation (i.e., the x-y plane) is often known as the horizontal resistivity, $R_H$, and the resistivity in the direction perpendicular to the plane of the formation (i.e., the z direction) is often known as the vertical resistivity, $R_V$. The index of anisotropy, $\eta$, is defined as $\eta=[R_V/R_H]^{1/2}$.

As a further complication to measuring formation resistivity, boreholes are generally not perpendicular to formation beds. The angle between the axis of the well bore and the orientation of the formation beds (as represented by a vector normal to the formation bed) has two components. These components are the dip angle and the strike angle. The dip angle is the angle between the borehole axis and the normal vector for the formation bed. The strike angle is the direction in which the boreholes axis "leans away from" the normal vector. (These will be defined more rigorously in the detailed description.)

Electromagnetic resistivity logging measurements are a complex function of formation resistivity, formation anisotropy, and the formation dip and strike angles, which may all be unknown. Moreover, engineers often rely on simplified models to interpret the measurements in a suitably prompt manner. Logging tools that fail to account for each of the unknown parameters and differences between the model and the operation of the "real world" tool may provide measurement quality that is less than ideal. Conversely, tools that account for each of these factors will provide improved resistivity measurements. Moreover, tools that are able to provide dip and strike measurements along with azimuthal orientation information, can be used for geosteering.

BRIEF DESCRIPTION OF THE DRAWINGS

Accordingly, there are disclosed herein tilted antenna logging systems and methods yielding robust measurements signals. In the drawings:

FIG. 1 shows an illustrative logging while drilling environment.

FIG. 2 shows an illustrative wireline logging environment.

FIG. 3 shows a relationship between coordinate axes of a borehole and a dipping formation bed.

FIGS. 8A-8D show alternative antenna configurations for an electromagnetic logging tool.

FIGS. 12A-12J show the illustrative phase and amplitude response of a robust signal set.

FIGS. 13A-13E show illustrative phase logs for the robust signal set.

Figure 4:
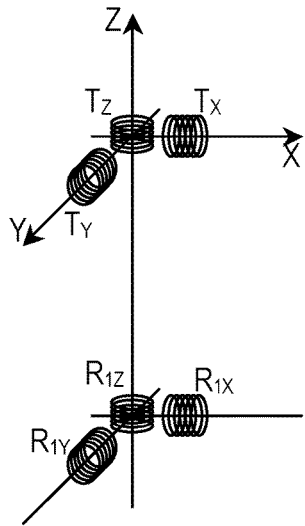
FIG. 4 shows an orthogonal triad antenna arrangement for an electromagnetic logging tool.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

The disclosed tool configurations and operations are best understood in the context of the larger systems in which they operate. Accordingly, an illustrative logging while drilling (LWD) environment is shown in FIG. 1. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An electromagnetic resistivity logging tool 26 is integrated into the bottom-hole assembly near the bit 14. As the bit extends the borehole through the formations, logging tool 26 collects measurements relating to various formation properties as well as the tool orientation and position and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver.

The tool orientation measurements may be performed using an azimuthal orientation indicator, which may include magnetometers, inclinometers, and/or accelerometers, though other sensor types such as gyroscopes can be used. Most preferably, the orientation measurements are collected using both a 3-axis fluxgate magnetometer and a 3-axis accelerometer. As is known in the art, the combination of those two sensor systems enables the measurement of the toolface, borehole inclination, and compass direction of the borehole. The toolface and hole inclination angles are calculated from the accelerometer sensor output. The magnetometer sensor outputs are used to calculate the compass direction. With the toolface, the hole inclination, and the compass information, a tool in accordance with the present disclosure can be used to steer the bit to the desirable bed.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and transporting telemetry from the tool to the surface. The illustrated sonde includes a resistivity logging tool 34 having centralizing arms 36 that center the tool within the borehole as the tool is pulled uphole. A logging facility 44 collects measurements from the logging tool 34, and includes computing facilities for processing and storing the measurements gathered by the logging tool.

FIG. 1 shows that the formations 18 are not perpendicular to the borehole, which may occur naturally or may be due to directional drilling operations. The borehole has a coordinate system 50 defined in accordance with the borehole's long axis (the z axis) and the north side (or alternatively, the high side) of the hole (the x-axis). The formations 18, when characterized as a plane, have a coordinate system 51 defined in accordance with the normal to the plane (the z" axis) and the direction of steepest descent (the x"-axis). As shown in FIG. 3, the two coordinate systems are related by two rotations. Beginning with the borehole's coordinate system (x,y,z), a first rotation of angle γ is made about the z axis. The resulting coordinate system is denoted (x',y',z'). Angle γ is the relative strike angle, which indicates the direction of the formation dip relative to the borehole's coordinate system. A second rotation of angle α is then made about the y' axis. This aligns the borehole coordinate system with the formation coordinate system. Angle α is the relative dip angle, which is the slope angle of the beds relative to the long axis of the borehole.

The vertical resistivity is generally defined to be the resistivity as measured perpendicular to the plane of the formation, and the horizontal resistivity is the resistivity as measured within the plane of the formation. Determination of each of these parameters (dip angle, strike angle, vertical resistivity, and horizontal resistivity) is desirable.

FIG. 4 shows a hypothetical antenna configuration for a multi-component electromagnetic resistivity logging tool. (The electromagnetic resistivity logging tool may be embodied as a wireline tool and as a logging while drilling tool.) A triad of transmitter coils $T_X$, $T_Y$ and $T_Z$, each oriented along a respective axis, is provided. At least one triad of similarly oriented receiver coils $R_X$, $R_Y$, and $R_Z$ is also provided at some distance from the transmitter triad. Moran and Gianzero, in "Effects of Formation Anisotropy on Resistivity Logging Measurements" Geophysics, Vol. 44, No. 7, p. 1266 (1979), noted that the magnetic field h in the receiver coils can be represented in terms of the magnetic moments m at the transmitters and a coupling matrix C:

$$h = mC \quad (1)$$

In express form, equation (1) is:

$$[H_x \ H_y \ H_z] = [M_x \ M_y \ M_z] \begin{bmatrix} C_{xx} & C_{xy} & C_{xz} \\ C_{yx} & C_{yy} & C_{zz} \\ C_{zx} & C_{zy} & C_{zz} \end{bmatrix}, \quad (2)$$

where $M_X$, $M_Y$, and $M_Z$ are the magnetic moments (proportional to transmit signal strength) created by transmitters $T_X$, $T_Y$, and $T_Z$, respectively, $H_X$, $H_Y$, $H_Z$ are the magnetic fields (proportional to receive signal strength) at the receiver antennas $R_X$, $R_Y$, and $R_Z$, respectively.

In the antenna configuration of FIG. 4, if each transmitter is fired in turn, and signal measurements are made at each receiver in response to each firing, nine signal measurements are obtained. These nine measurements enable the determination of a complete coupling matrix C. ($C_{IJ} = a_{IJ} V_{IJ}$, where I is the index for transmitter $T_X$, $T_Y$, or $T_Z$, J is the index for receiver $R_X$, $R_Y$, or $R_Z$, $a_{IJ}$ is a constant determined by the tool design, and $V_{IJ}$ is a complex value representing the signal amplitude and phase shift measured by receiver J in response to the firing of transmitter I.) Knowledge of the complete coupling matrix enables the determination of dip angle, strike angle, vertical resistivity, and horizontal resistivity. A number of techniques may be used to determine these parameters. For example, dip and strike angle may be determined from coupling matrix values as explained by Li Gao and Stanley Gianzero, U.S. Pat. No. 6,727,706 "Virtual Steering of Induction Tool for Determination of Formation Dip Angle". Given these angles, vertical and horizontal resistivity can be determined in accordance with equations provided by Michael Bittar. U.S. Pat. No. 7,019,528 "Electromagnetic Wave Resistivity Tool Having a Tilted Antenna for Geosteering within a Desired Payzone". Alternatively, a simultaneous solution for these parameters may be found as described in the Bittar reference.

Figure 5A:
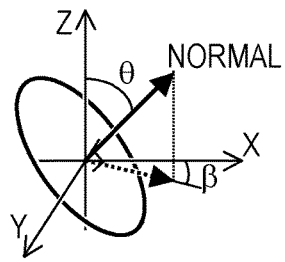
FIG. 5A shows angles for defining the orientation of a tilted antenna.
Figure 5B:
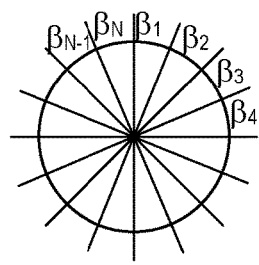
FIG. 5B shows azimuthal bins around a borehole circumference.

FIG. 5A shows two angles that may be used to specify the orientation of a tilted coil antenna. The tilted coil antenna may be considered as residing in a plane having a normal vector. Tilt angle θ is the angle between the longitudinal axis of the tool and the normal vector. Azimuth angle β is the angle between the projection of the normal vector in the X-Y plane and the tool scribe line. Alternatively, in the downhole context, azimuthal angle β may represent the angle between projection of the normal vector in the X-Y plane and the x-axis of the borehole coordinate system. FIG. 5B shows a division of the borehole circumference into n bins, each bin corresponding to a range of azimuthal angle values. A representative (e.g., average) azimuthal angle is associated with each bin. Tilted antenna measurements may be associated with the bin containing the azimuthal angle for that antenna, the angle (and corresponding bin) changing as the tool rotates.

It is noted that three transmitter antenna orientations and three receiver antenna orientations are employed in the antenna configuration of FIG. 4. It has been discovered that when tool rotation is exploited, it is possible to determine the full coupling matrix with only one transmitter and two receiver antenna orientations (or equivalently, one receiver and two transmitter antenna orientations). Of course, more transmitter and/or receiver antennas can be employed and may be helpful for producing more robust measurements as described below.

Figure 6:
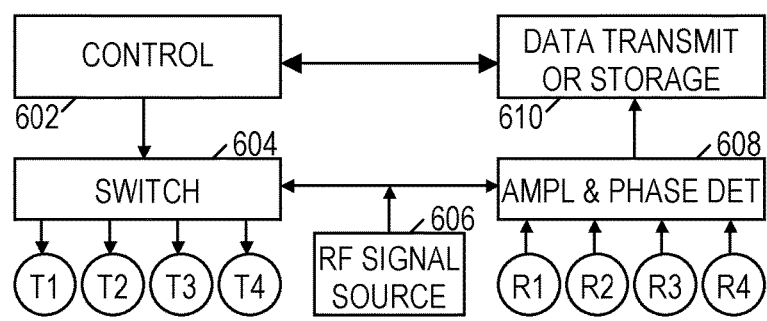
FIG. 6 is a block diagram of an illustrative electronics module for an electromagnetic logging tool.

Before considering various tools having specific antenna configurations, the electronics common to each tool are described. FIG. 6 shows a functional block diagram of the electronics for a resistivity tool. The electronics include a control module 602 that is coupled to an analog switch 604. Analog switch 604 is configured to drive any one of the transmitter coils $T_1$, $T_2$, $T_3$, $T_4$ with an alternating current (AC) signal from a signal source 606. In at least some embodiments, the signal source provides radio frequency signals. The control module 602 preferably selects a transmitter coil, pauses long enough for transients to die out, then signals data storage/transmit module 610 to accept an amplitude and phase sample of the signals measured by each of the receiver coils. The control module 602 preferably repeats this process sequentially for each of the transmitters. The amplitude and phase shift values are provided by amplitude and phase shift detector 608 which is coupled to each of the receiver coils $R_1$-$R_4$ for this purpose.

Control module 602 may process the amplitude and phase shift measurements to obtain compensated measurements and/or measurement averages. In addition to being stored in memory downhole, the raw, compensated, or averaged measurements may be transmitted to the surface for processing to determine coupling matrix elements, dip and strike angles, vertical and horizontal resistivity, and other information such as (i) distance to nearest bed boundary, (ii) direction of nearest bed boundary, and (iii) resistivity of any nearby adjacent beds. Alternatively, all or some of this processing can be performed downhole and the results may be communicated to the surface. The data storage/transmitter module 610 may be coupled to telemetry unit 28 (FIG. 1) to transmit signal measurements or processing results to the surface. Telemetry unit 28 can use any of several known techniques for transmitting information to the surface, including but not limited to (1) mud pressure pulse; (2) hard-wire connection; (3) acoustic wave; and (4) electromagnetic waves.

Figure 7:
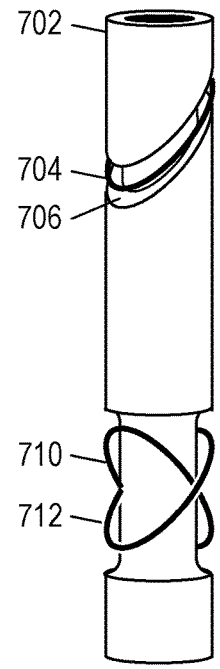
FIG. 7 shows an illustrative electromagnetic logging tool having tilted transmit and receive antennas.

FIG. 7 shows an electromagnetic resistivity logging tool 702 having only two receiver antenna orientations. The tool 702 is provided with one or more regions 706 of reduced diameter. A wire coil 704 is placed in the region 706 and in some embodiments is spaced away from the surface of subassembly 702 by a constant distance. To mechanically support and protect the coil 704, a non-conductive filler material (not shown) such as epoxy, rubber, or ceramic may be used in the reduced diameter regions 706. Coil 704 is a transmitter coil, and coils 710 and 712 are receiving coils, though these roles can be reversed in view of the principle of reciprocity. In operation, transmitter coil 704 transmits an interrogating electromagnetic signal which propagates through the borehole and surrounding formation. Receiver coils 710, 712 detect the interrogating electromagnetic signal and provide a measure of the electromagnetic signal's amplitude attenuation and phase shift. For differential measurements additional receiver coils parallel to coils 710, 712 may be provided at an axially-spaced distance (see, e.g., FIGS. 8A-8D). From the absolute or differential amplitude attenuation and phase shift measurements, the coupling matrix components can be determined and used as the basis for determining formation parameters and as the basis for geosteering.

In some embodiments, the transmitter coil 704 is spaced approximately 30 inches from the receiver coils 710, 712. The additional receiver coils could be positioned approximately 8 inches further from the transmitter coil. The transmitter and receiver coils may comprise as little as one loop of wire, although more loops may provide additional signal power. The distance between the coils and the tool surface is preferably in the range from 1/16 inch to 3/4 inch, but may be larger. Transmitter coil 704 and receiver coil 712 may each have a tilt angle of about 45° and aligned with the same azimuth angle, while receiver coil 710 may have a tilt angle of about 45° and an azimuth 180° apart from receiver coil 712 (or equivalently, a tilt angle of minus 450 at the same azimuth angle as receiver coil 712).

The signal measured by a tilted receiver in response to the firing of a tilted transmitter can be expressed in terms of the signals Vu that would be measured by the tool of FIG. 4. When both transmitter and receiver coils are oriented at the same azimuth angle β, the tilted receiver signal $V_R$ is $$V_R(\beta) = \begin{bmatrix} \sin\theta_T\cos\beta \\ \sin\theta_T\sin\beta \\ \cos\theta_T \end{bmatrix}^T \begin{bmatrix} V_{xx} & V_{yx} & V_{zx} \\ V_{xy} & V_{yy} & V_{zy} \\ V_{xz} & V_{yz} & V_{zz} \end{bmatrix} \begin{bmatrix} \sin\theta_R\cos\beta \\ \sin\theta_R\sin\beta \\ \cos\theta_R \end{bmatrix} \quad (3)$$

where $\theta_T$ is the tilt angle of the transmitter and $\theta_R$ is the tilt angle of the receiver. In written-out form, the received signal is:

$$V_R(\beta) = \quad (4)$$
$$\left[\left(\frac{C_{xx}}{2} - \frac{C_{yy}}{2}\right)\cos2\beta + \left(\frac{C_{yx} + C_{xy}}{2}\right)\sin2\beta\right] + [(C_{zx} + C_{xz})\cos\beta +$$
$$(C_{zy} + C_{yz})\sin\beta] + \left(C_{zz} + \frac{C_{xx}}{2} + \frac{C_{yy}}{2}\right) =$$
$$V_{double}(\beta) + V_{single}(\beta) + V_{const}$$

meaning that $$\begin{cases} V_{double}(\beta) = \left(\frac{C_{xx}}{2} - \frac{C_{yy}}{2}\right)\cos2\beta + \left(\frac{C_{yx} + C_{xy}}{2}\right)\sin2\beta \\ V_{single}(\beta) = (C_{zx} + C_{xz})\cos\beta + (C_{zy} + C_{yz})\sin\beta \\ V_{const} = C_{zz} + \frac{C_{xx}}{2} + \frac{C_{yy}}{2} \end{cases} \quad (5)$$

where $$\begin{cases} C_{xx} = V_{xx}\sin\theta_t\sin\theta_r; & C_{yx} = V_{yx}\sin\theta_t\sin\theta_r; & C_{zx} = V_{zx}\cos\theta_t\sin\theta_r \\ C_{xy} = V_{xy}\sin\theta_t\sin\theta_r; & C_{yy} = V_{yy}\sin\theta_t\sin\theta_r; & C_{zy} = V_{zy}\cos\theta_t\sin\theta_r \\ C_{xz} = V_{xz}\sin\theta_t\cos\theta_r; & C_{yz} = V_{yz}\sin\theta_t\cos\theta_r; & C_{zz} = V_{zz}\cos\theta_t\cos\theta_r \end{cases} \quad (6)$$

Sinusoidal curve fitting may be applied to the received signal to extract the (summed) coefficients in equation (5). The measurements of a second tilted receiver's response to the tilted transmitter provides an additional set of measurements that enables the individual $C_{IJ}$ (or equivalently, the $V_1$) values to be obtained. (Note that in most cases $V_{xy}$ may be assumed equal to $V_{yx}$, but the same is not true for the other cross components.) As an example, take $\theta_1 = \theta_{r2} = \theta_c$ and $\theta_{r1} = -\theta_{r2}$, with the receivers R1 and R2 collocated at a distance $d_1$ from the transmitter. The zz coupling component with can be written as $$V_{zz}(d_1) = \frac{V_{r1\_const} + V_{r2\_const}}{2\cos^2\theta_c} \quad (7)$$

where $V_{r1\_const}$ is the constant complex voltage $V_{const}$ from equation (4) associated with receiver R1, and $V_{R2\_const}$ is the corresponding value for receiver R2. Along similar lines, the xx and yy components can be written $$V_{xx}(d_1) = \frac{(V_{r1\_const} - V_{r2\_const}) + (V_{r1\_double\_cos} - V_{r2\_double\_cos})}{2\sin^2\theta_c} \quad (7b)$$

$$V_{yy}(d_1) = \frac{(V_{r1\_const} - V_{r2\_const}) - (V_{r1\_double\_cos} - V_{r2\_double\_cos})}{2\sin^2\theta_c} \quad (7c)$$

The cross components can be written:

$$V_{xy}(d_1) = V_{yx}(d_1) = \frac{V_{r1\_double\_sin} - V_{r2\_double\_sin}}{2\sin^2\theta_c} \quad (8a)$$

$$V_{yz}(d_1) = \frac{V_{r1\_single\_sin} + V_{r2\_single\_sin}}{2\cos\theta_c\sin\theta_c} \quad (8b)$$

$$V_{zy}(d_1) = \frac{V_{r1\_single\_sin} - V_{r2\_single\_sin}}{2\cos\theta_c\sin\theta_c} \quad (8c)$$

$$V_{xz}(d_1) = \frac{V_{r1\_single\_cos} + V_{r2\_single\_cos}}{2\cos\theta_c\sin\theta_c} \quad (8d)$$

$$V_{zx}(d_1) = \frac{V_{r1\_single\_cos} - V_{r2\_single\_cos}}{2\cos\theta_c\sin\theta_c} \quad (8e)$$

Other techniques for deriving the coupling components from the received signal measurements are known and may be used. See, e.g., WO 2008/076130 "Antenna coupling component measurement tool having a rotating antenna configuration" and WO 2011/129828 "Processing and Geosteering with a Rotating Tool".

To provide more robust measurements, additional transmitters and/or receivers may be included on the tool as indicated in FIGS. 8A-8D. FIG. 8A shows a tool having a first set of oppositely tilted receiver antennas (Rup1, Rup2, with respective skew angles −θc and +θc) at a distance d1 from a tilted transmitter antenna (Tup1 with skew angle +θc) and a second set of oppositely tilted receiver antennas (Rdn1, Rdn2 at −θc and +θc) at a distance d2 from tilted transmitter antenna Tup1. The additional set of receiver antennas enables cancellation of the mandrel effect as explained further below. The illustrated tool further includes a second tilted transmitter antenna (Tdn1 at +θc) positioned at distance d1 from the second set of receiver antennas and distance d2 from the first set of receiver antennas. The additional transmitter antenna enables compensation of temperature effects in the receiver electronics as explained further below.

FIG. 8B shows an alternative antenna configuration in which the additional transmitter antenna is skewed in an opposite direction from the first transmitter antenna. FIG. 5C shows an antenna configuration with two sets of oppositely-tilted transmitter antennas (±θc) and a single tilted receiver antenna at distance d1 and a single receiver antenna at distance d2, the two receiver antennas being parallel (+θc). FIG. 8D is similar, but has the two receiver antennas skewed in opposite directions. Yet another antenna configuration would include two sets of oppositely-tilted transmitter antennas together with two sets of oppositely-tilted receiver antennas. It is further noted that the receiver antennas are shown as being positioned between the transmitter antennas, but this is not a requirement, as some tool embodiments may have the transmitter antennas positioned between the receiver antennas.

Given the illustrative antenna configurations, the tool measurements may be combined as outlined below to provide more robust values, i.e., measurements that are insensitive to environmental effects (e.g., temperature, pressure, and eccentricity) and that compensate for tool non-idealities such as the presence of a conductive tool mandrel when the models assume point dipoles. As one step in this direction, the tool may acquire measurements with a second set of receivers at a distance d2 from the transmitter (see, e.g., FIG. 8A). The ratio (hereafter termed "Signal 1" or S1):

$$S1 = V_{zz}(d_1)/V_{zz}(d_2) \quad (9)$$

has been found to significantly reduce sensitivity to the mandrel effect, and it serves as a good indication of formation resistivity. Signal 1 can be calibrated by means of an air-hang measurement in which the tool is suspended sufficiently far from any conductive or partially conductive materials (e.g., 20 feet in the air) and the received signal responses noted. Representing the air-hang measurements with an "air" superscript, the calibrated signal is:

$$S_1^{cal} = \frac{V_{zz}(d_1)}{V_{zz}(d_2)} \Big/ \frac{V_{zz}^{air}(d_1)}{V_{zz}^{air}(d_2)} = \frac{V_{zz}(d_1)}{V_{zz}^{air}(d_1)} \Big/ \frac{V_{zz}(d_2)}{V_{zz}^{air}(d_2)} \quad (10)$$

The second expression above simply indicates that the calibration can be equivalently performed on a component by component basis.

Taking as an example the antenna configuration of FIG. 8A with a mandrel diameter of 4.0", an antenna coil diameter of 4.5"(as measured by projecting the coil onto the x-y plane), a first transmit-receive antenna spacing of d1=28" and a second transmit-receive antenna spacing of d2=36", and an operating signal frequency of 500 kHz, a simulation was performed to illustrate the effects of the mandrel on the measured signals given by equations (9) and (10). As the signals are complex-valued, they are graphed in FIG. 9 in terms of their amplitude and phase angle.

Figure 9A:
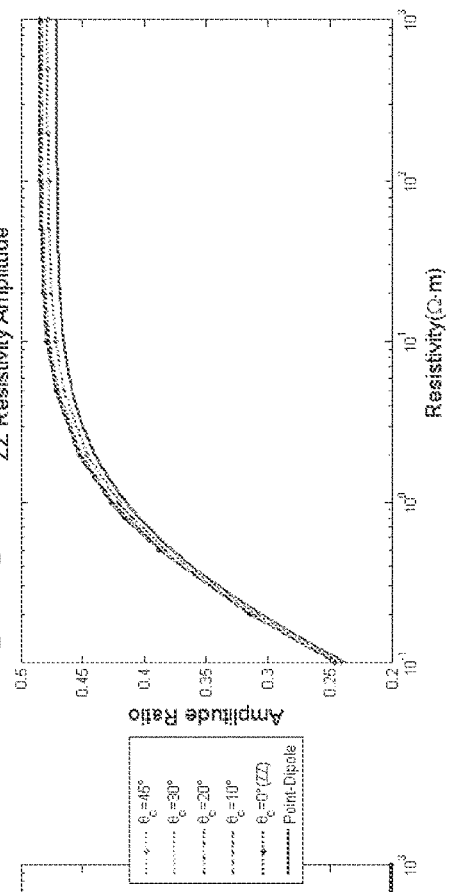
FIGS. 9A-9D compare the phase and amplitude of uncalibrated and calibrated signal coupling components.
Figure 9B:
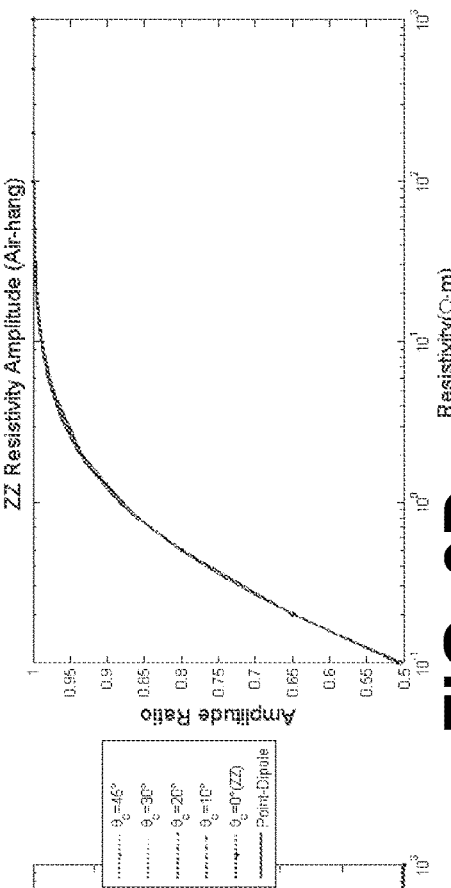
Figure 9C:
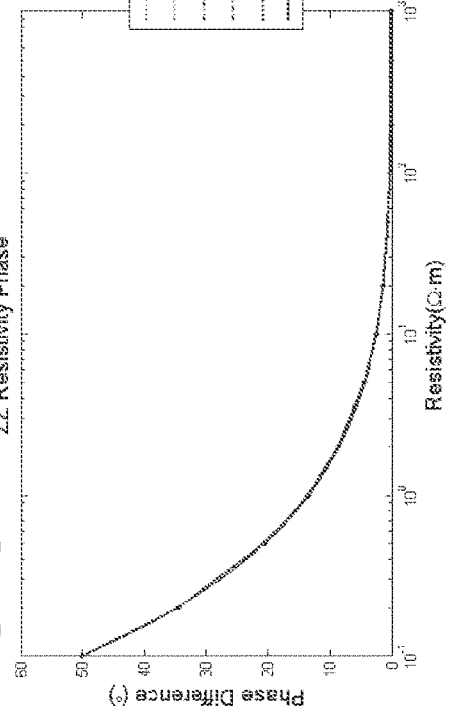
Figure 9D:
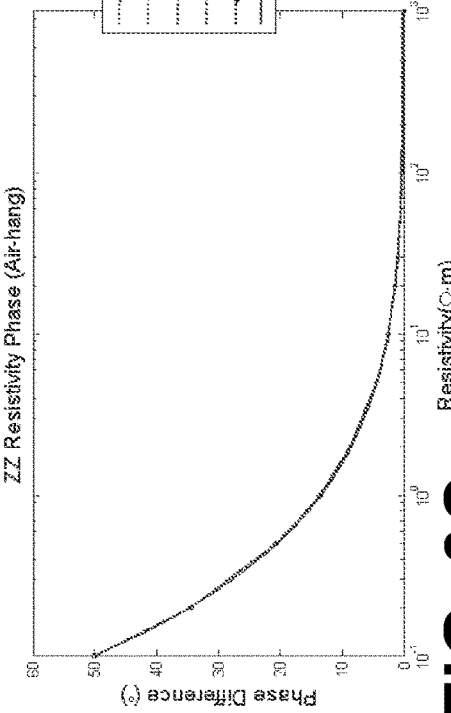

FIGS. 9A and 9B show the phase angle and amplitude of Signal 1 (equation 9) as a function of formation resistivity and skew angle. For comparison, the expected signal derived from a point-dipole model is also shown. FIGS. 9C and 9D show the phase angle and amplitude of the calibrated Signal 1 (equation 10) as a function of formation resistivity and skew angle. The phase angle curves overlap so well as to be indistinguishable. FIG. 9B, however, indicates a significant mandrel effect when tools having low antenna skew angles measure formations with higher resistivities. The calibrated signals, however, adequately correct for this effect and bring the curves largely into alignment with the point dipole model. As the slope of the signal curve flattens out for high resistivities, the formation resistivity calculation may be sensitive to small errors in this region.

To improve resistance to temperature effects, compensated measurements can be used. Such compensation techniques are known (at least with respect to tools using coaxial antennas), and they combine the measurements extracted from the receivers' responses to the first antenna with the receivers' responses to the second antenna. For example, denoting the calibrated signal measurement derived from transmitter Tup1 (FIG. 8B) as $S_1^{cal}(T_{up1})$ and the calibrated signal measurement derived from Tdn1 as $S_1^{cal}(T_{dn1})$, the compensated signal measurement can be expressed as $$S_1^{comp} = \sqrt{S_1^{cal}(T_{up1}) \cdot S_1^{cal}(T_{dn1})} \quad (11)$$

An alternative compensation approach is to simply average the two calibrated measurements. Depending on the antenna configuration it may be desirable to precede this compensation calculation with depth shifting and/or azimuth reversal of the calibrated signal measurements to ensure that the measurements collected using the different antennas are all associated with the same region of the formation. The additional measurements can also improve signal to noise ratio.

Figure 10A:
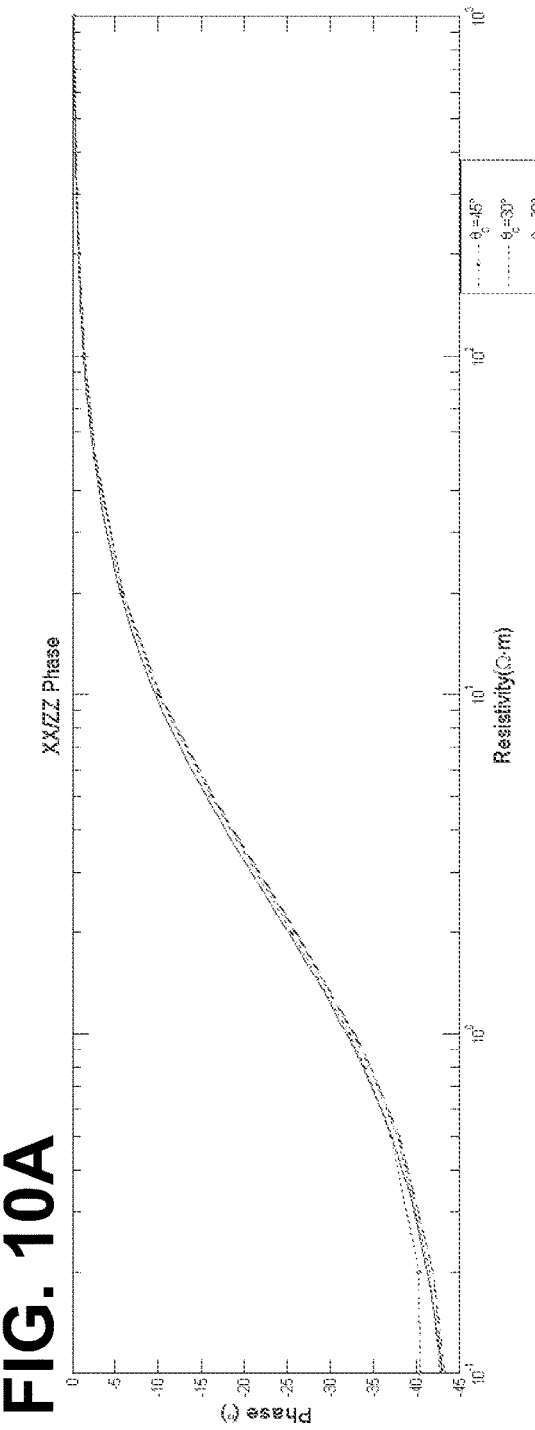
FIGS. 10A-10B show the phase and amplitude of an illustrative robust signal.
Figure 10B:
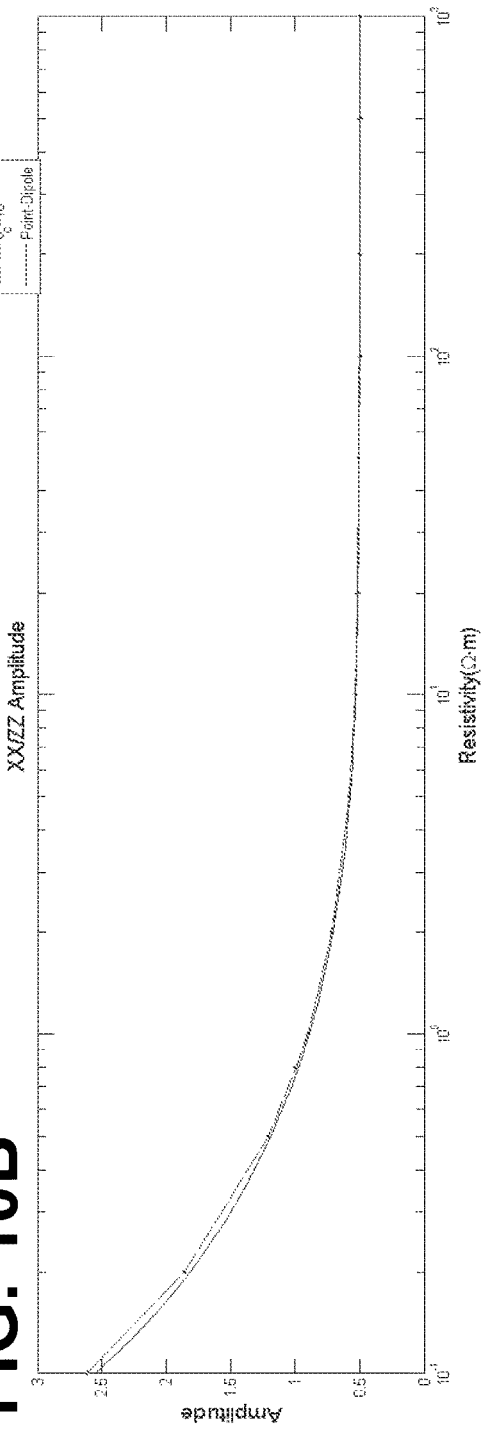

Returning to a single-transmitter analysis, we now consider additional tool signals. As with Signal 1, it is helpful to normalize the other coupling components. Unfortunately, the distance effect on the xx coupling component measurements is different than the effect on the zz coupling component measurements, making a different approach desirable. The ratio thereafter termed "Signal 2" or "S2":

$$S2(d) = V_{xx}(d)/V_{zz}(d) \qquad (12)$$

has been found to compensate for the mandrel effect and produce a better approximation of a point-dipole tool response. It can be calibrated and compensated in a similar fashion as Signal 1. The responses of the second set of receivers can also be taken into account with a geometrical average, yielding a combined S2:

$$S_2^{combined} = \sqrt{S_2(d_1) \cdot S_2(d_2)} \qquad (13)$$

which can also be calibrated and compensated as described previously. FIGS. 10A and 10B show the phase and amplitude of the combined, uncalibrated, uncompensated S2 as a function of resistivity and skew angle. (Because of the denominator in equation 7b, a zero skew angle is not included.) A point-dipole tool model response is also shown. For resistivities above about 0.2 Ωm, the match to the point-dipole model is quite good. A similar response is expected for Signal 3, which is defined:

$$S3(d) = V_{yy}(d)/V_{zz}(d) \qquad (14)$$

with $$S_3^{combined} = \sqrt{S_3(d_1) \cdot S_3(d_2)} \qquad (15)$$

In a similar vein, a fourth signal may be defined:

$$S4(d) = V_{xx}(d)/V_{yy}(d) \qquad (16)$$

with $$S_4^{combined} = \sqrt{S_4(d_1) \cdot S_4(d_2)} \qquad (17)$$

It is expected that an approximate skew angle of 45° would offer the best noise immunity as it provides antenna responses with roughly equal signal responses from the xx and zz components. We note that signal S4 can be defined using the inverse ratio with equally effective results.

Figure 11B:
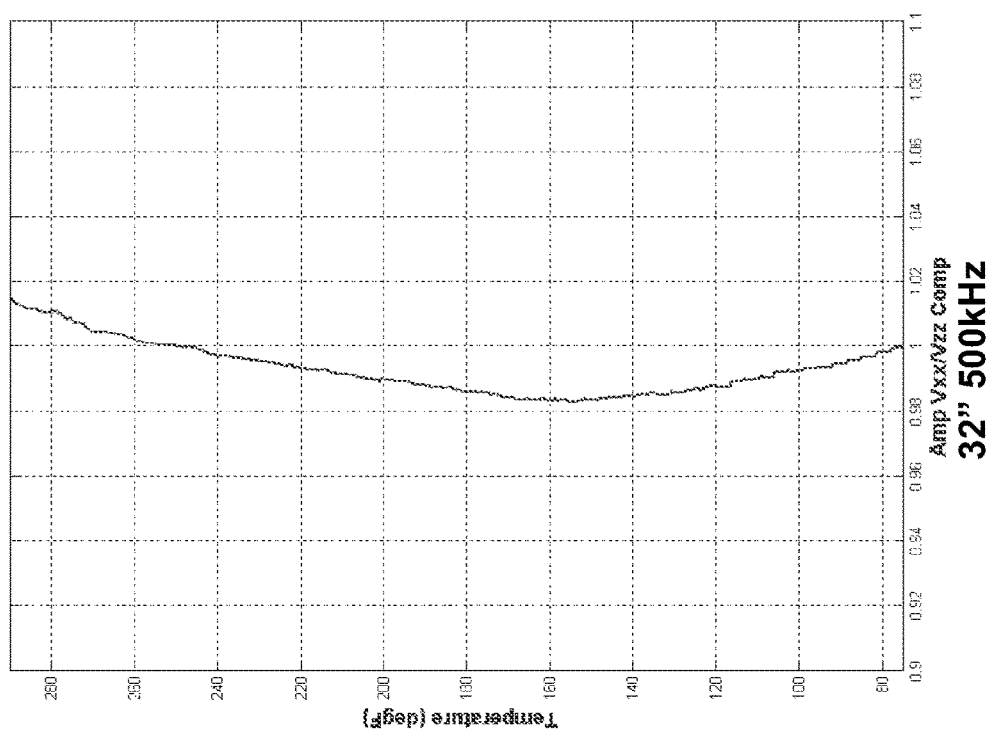
FIGS. 11A-11B show the phase and amplitude of illustrative instrumentation drift for the robust signal.
Figure 11A:
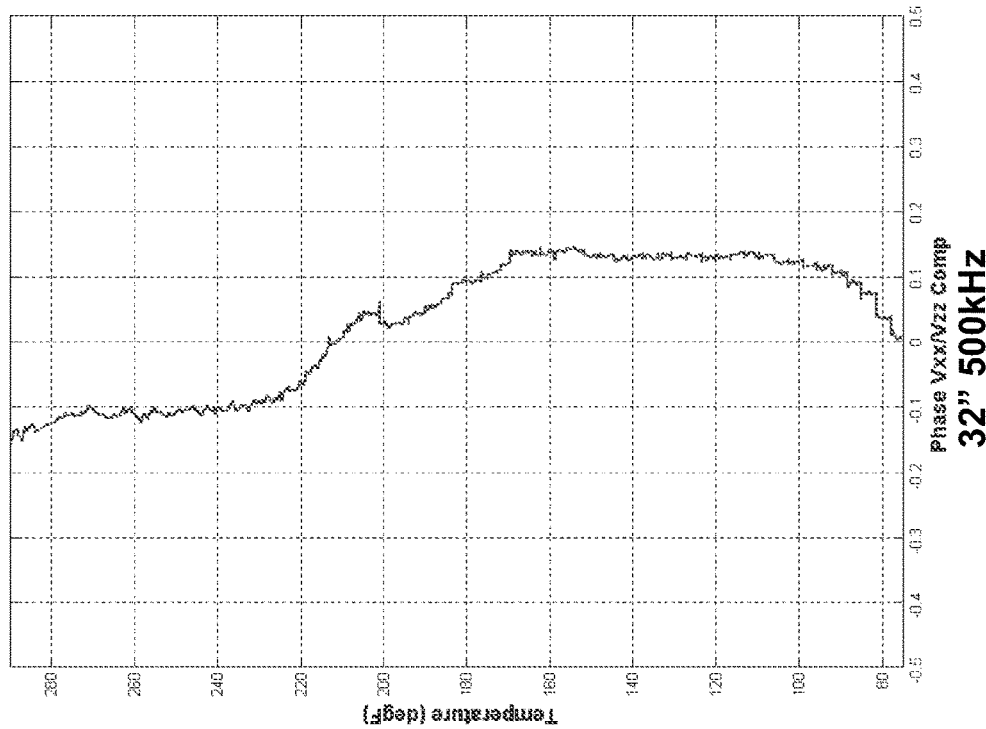

FIG. 11 illustrates the results of a cool-down test, in which a logging tool is heated to 300° C. before being suspended in the air and allowed to cool to ambient temperature. FIGS. 11A and 11B show the phase and amplitude of the calibrated (but not combined or compensated) S2 signal as a function of temperature. The signal variation is approximately ±0.1° of phase and ±2% of amplitude. With compensated measurements, this variation is essentially eliminated.

Though the foregoing four signals have each been defined in terms of a ratio between two components, the definition of robust signals need not be so limited. A fifth contemplated signal is defined as:

$$S_5(d) = \frac{V_{xz}(d) + V_{zx}(d) + V_{const}(d)}{V_{const}(d)} \qquad (18)$$

The fifth signal offers an enhanced sensitivity to relative dip angle. As with the other signals, combined, calibrated, and compensated versions of the fifth signal can be determined. With this set of robust measurement signals, one can expect to compute very reliable inversion results.

The ratio, calibration, and compensation techniques that have been applied to the extracted coupling components can also be applied to the receiver signals. Thus, for example, an calibrated azimuthal resistivity signal can be expressed $$V_{Res}^{Calibrated}(\beta) = \frac{\frac{V_{Rdn1}(\beta) - V_{Rdn2}(\beta)}{V_{Rup1}(\beta) - V_{Rup2}(\beta)}}{\frac{V_{Rdn1\_const}^{air} - V_{Rdn2\_const}^{air}}{V_{Rup1\_const}^{air} - V_{Rup2\_const}^{air}}} \qquad (19)$$

or a geosteering signal based on operation of a first transmitter Tup1 can be expressed $$V_{Geo}^{Tup1}(\beta, d_1) = \frac{V_{R_{up2}}(\beta, d_1) + V_{R_{up1}}(\beta, d_1)}{V_{R_{up2}}(\beta, d_1) - V_{R_{up1}}(\beta, d_1)} \qquad (20)$$

and a combined geosteering signal can be expressed:

$$V_{Geo}^{Tup1-comb}(\beta) = V_{Geo}^{Tup1}(\beta, d_1) \cdot V_{Geo}^{Tup1}(\beta, d_2) \qquad (21)$$

Eq. (17) to Eq. (19) illustrate general compensation methods that apply to azimuthal measurements of MWD/LWD tools with tilted antenna systems. These signal, can be used to determine formation parameters, such as formation resistivity, formation anisotropy, formation relative dip angle, etc. In addition, due to the cancellation of mandrel and temperature effects, these signals can be also used for look-ahead tools.

It is noted that signals S1-S5 are calculated from the coupling components, and can be determined from these components regardless of how the coupling components were derived from the tool measurements. Among other things, this observation indicates that the principles disclosed herein can be applied to the measurements of any antenna configuration sufficient to determine the coupling components (including that of FIG. 4) and regardless of whether the tool is embodied in wireline or LWD form. It is further noted that while each of the combination, calibration, and compensation operations described above can contribute to improving measurement accuracy, each of these operations is optional. The order in which the chosen operations are applied is largely a matter of convenience and can be varied without significantly impacting their potential benefits. Some or all of the combination, calibration, and/or compensation operations can be performed on the extracted coupling components before or after the ratio calculations that yield signals S1-S5, and in at least some cases, they could be performed on the (azimuthally dependent) received signal measurements before the extraction of the coupling components.

We have found that signal set S1-S4 serves as an excellent set of inputs from which formation parameters such as horizontal resistivity, anisotropy, dip angle, and strike angle can be derived. Accuracy is improved with the use of additional signals such as signal S5. FIGS. 12A-12E illustrate the phases of signals S1-S5 and FIGS. 12F-12J illustrate the amplitudes of signals S1-S5 for different resistivities, anisotropies, and dip angles in a homogeneous formation. The signals' sensitivities to each of these parameters is evident from an inspection of these figures, and the calibration, combination, and compensation techniques outlined previously do not inhibit this sensitivity, as has been found to be the case for other noise reduction techniques.

Without limiting the manner in which the signal set is employed to derive the formation parameters, we note that the S1 signal closely relates to the operation of a conventional logging tool and indeed, can be converted to a conventional resistivity signal. Signal S2 and S3 can be used to determine resistive anisotropy of the formation. Signal S4 captures the divergence of the xx and yy coupling components and provides a useful sensitivity to dip angle. Signal S5 relates the cross-coupling components to the direct coupling components and serves to speed the inversion with its unique sensitivity to the formation parameters. Performing inversion on the set of signals S1-S4 or S1-S5 yields a robust estimate of formation parameters.

FIGS. 13A-13E illustrate the set of signals S1-S5 derived from a set of real-world measurements (as provided in FIG. 14) by a tool having the antenna configuration of FIG. 8B. These signal logs may be printed, displayed on a computer screen, or otherwise made tangible for a user to study and analyze. The signal logs show signal phase as a function of measured depth (i.e., position along the borehole). Inversion was performed on signals S1-S5 using a Levenberg-Marquardt technique with a OD inversion code for a point-dipole model yielded the predicted signals set indicated by the broken lines in FIG. 13. A excellent match between the derived ("raw") signals and the predicted ("sim") signals can be observed. The obtained parameters also match what the petrophysicists know about this well from other sources.

Figure 14:
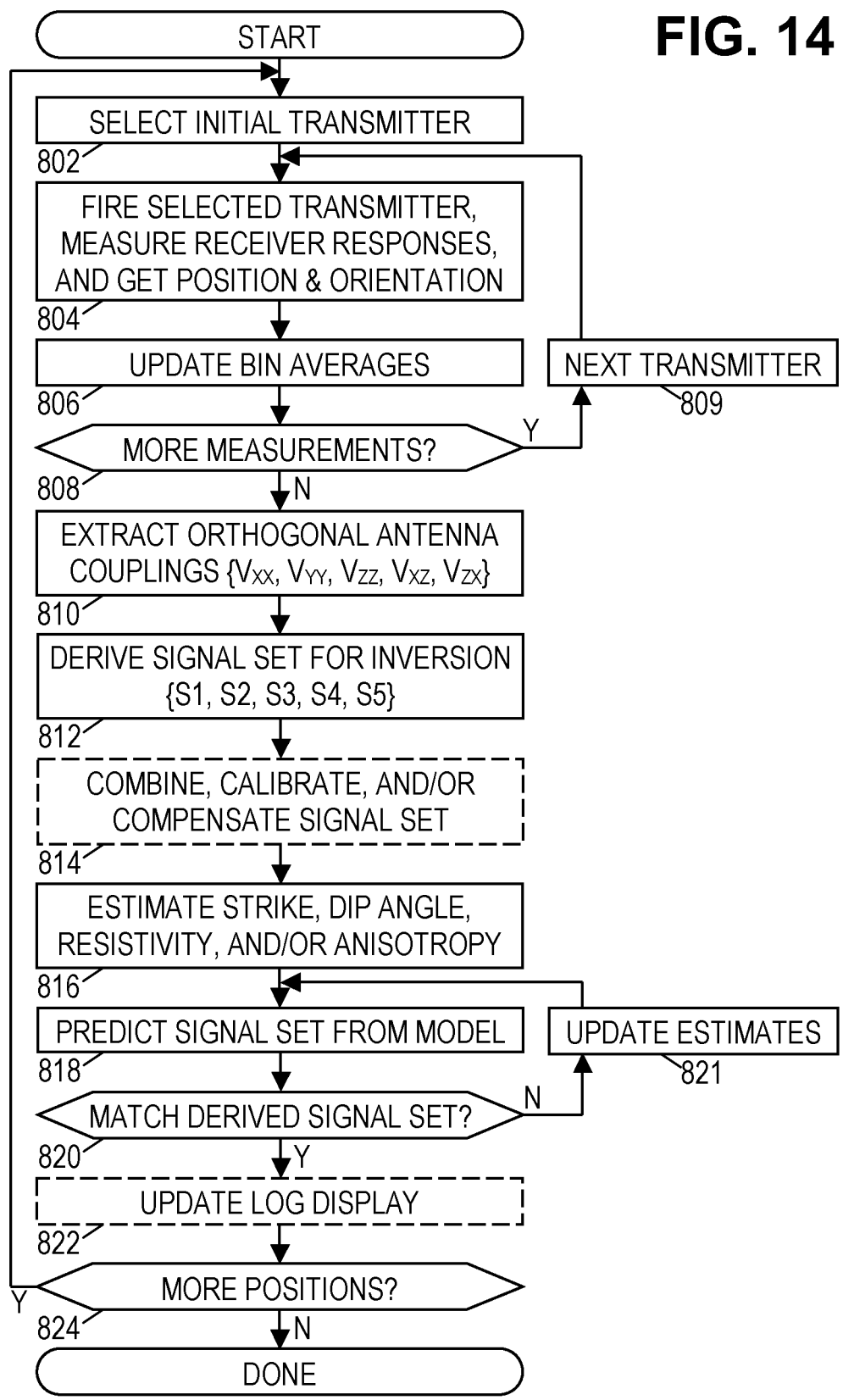
FIG. 14 is a flowchart of an illustrative electromagnetic logging method.

FIG. 14 is a flowchart of an illustrative tilted antenna logging method which may be performed by a downhole controller, by a surface computing facility that receives measurements from the tool, or performed cooperatively by both. In block 802 an initial transmitter is selected. In block 804, the selected transmitter is fired, and the amplitude and phase of each receiver's response is measured. The tool's position and orientation are also captured and used to associate the receiver response measurements with an measurement bin. (Because the borehole wall is conceptually divided into a grid, each bin has both an angular extent and an axial extent.) In block 806, the latest measurements are used to update the average response for each receiver for the given bin.

In block 808, a test is made to determine whether additional measurements are needed or will be forthcoming at the current borehole position. For example, in tools having multiple transmitters, it is desired to have measurements from each transmitter. Other reasons for needing additional measurements include having a desired number of measurements within each measurement bin before additional processing is performed, or having at least a given number of azimuthally different measurements before additional processing is performed. If additional measurements at the current position are expected, the additional processing may be postponed until all the relevant measurements have been collected. The logging process then proceeds with the selection of the next transmitter in block 809 and blocks 804-809 are repeated until sufficient measurements have been achieved for the current borehole position.

Once a sufficient number of measurements have been obtained at a given position in the borehole, the method continues with block 810, where the orthogonal antenna coupling are extracted from the azimuthally-dependent measurements collected at the current borehole position. This may be done in accordance with the equations (3)-(8) given above, or by any suitable method including a least squares solution to a linear system of equations such a, that disclosed in WO 2008/076130 "Antenna coupling component measurement tool having a rotating antenna configuration". Certain antenna configurations (e.g., those using orthogonal triads) may yield such measurements directly.

In block 812, signals S1-S5 are derived from the orthogonal components as described above. There may be a set of such signals for each of multiple transmit-receive antenna pairings, which can be subjected to a combination operation (to combine measurements by receivers at different distances) and/or a compensation operation (to combine measurements obtained in response to different transmitters) to yield more accurate signals S1-S5 in optional block 814. An optional calibration operation may also be applied in block 814.

In block 816, an initial estimate of the formation parameters is made. This estimate can be based on default values, previous results, or randomly generated. The contemplated formation parameters include horizontal resistivity, anisotropy, dip angle, and strike, but other parameters can be employed. In block 818, a predicted set of signals S1-S5 is generated from a model based on the estimated formation parameter values. In block 820, the predicted signal set is compared to the set of signals derived in blocks 812-814. If there is not an adequate match, the estimated values are updated in block 821 in accordance with a Levenberg-Marquardt technique, a Gauss-Newton technique, or other numerical solution technique. Blocks 818-821 are repeated until the predicted set of signals converges to the derived set. Then, in optional block 822, a real-time log displaying one or more of the formation parameters as a function of position is updated with the newly determined parameter values. The log associates the calculated values with a depth or axial position within the borehole.

In block 824 a check is made to determine if logging information is available (or will become available) for additional positions within the borehole. If so, the process begins again with block 802. Otherwise, the process terminates.

Numerous variations and modifications will become apparent to those skilled in the art once the above disclosure is fully appreciated. For example, the foregoing disclosure describes numerous antenna configurations in the context of a logging while drilling tool, such antenna configurations can also be readily applied to wireline logging tools. Furthermore, the principle of reciprocity can be applied to obtain equivalent measurements while exchanging each antenna's role as a transmitter or receiver. It is intended that the following claims be interpreted to embrace all such variations and modifications.

What is claimed is:

1. An electromagnetic logging method that comprises:
    obtaining signal measurements collected using an azimuthally sensitive electromagnetic logging tool with a titled antenna as a function of position in a borehole, the tool having at least two spacing distances (d1, d2) between transmit and receive antennas;
    deriving orthogonal direct coupling measurements (Vxx, Vyy, Vzz) from the signal measurements;
    providing a set of robust signals as a function of position in the borehole, the robust signals including:
        a ratio between Vzz coupling components at different spacing distances,
        a ratio between Vxx and Vzz coupling components,
        a ratio between Vyy and Vzz coupling components, and
        a ratio between Vxx and Vyy coupling components; and using the set of robust signals to determine a log of one or more formation parameters.

2. The method of claim 1, further comprising displaying the set of robust signals in log form to a user.

3. The method of claim 1, wherein as part of said deriving or providing, the method includes combining measurements associated with different spacing distances to obtain each of the robust signals.

4. The method of claim 3, wherein as part of said deriving or providing, the method further includes employing measurements associated with different transmit antennas to ensure that the robust signals are compensated for instrumentation drift.

5. The method of claim 1, wherein as part of said deriving or providing, the method includes using air-hang measurements for calibration of each of the robust signals.

6. The method of claim 1, wherein the tool is a logging while drilling tool having one or more tilted antennas.

7. The method of claim 1, wherein the tool is a wireline tool having at least one triad of orthogonal transmit antennas and at least one triad of orthogonal receive antennas.

8. The method of claim 1, further comprising providing and additional robust signal having a ration between a sum of cross-coupling components Vxz+Vzx or Vyz+Vzy and a weighted or unweighted sum of orthogonal direct coupling components.

9. The method of claim 8, wherein the additional robust signal is expressible as $$S_5 = 1 + \frac{V_{xz} + V_{zx}}{\frac{1}{2}V_{xx} + \frac{1}{2}V_{yy} + V_{zz}}.$$

10. An electromagnetic logging system for determining resistivity of earth formations that comprises:
an azimuthally sensitive electromagnetic logging tool with a titled antenna, wherein the tool has at least two spacing distances (d1, d2) between a transmit antenna and a receive antenna, wherein the tilted antenna transmits an electromagnetic signal, wherein the receive antenna is used to collect signal measurements;
a memory that stores logging software; and
at least one processor coupled to the memory to execute the logging software, the software causing the at least one processor to:
obtain the azimuthally sensitive electromagnetic logging tool's signal measurements as a function of position in a borehole;
derive orthogonal direct coupling measurements (Vxx, Vyy, Vzz) from the signal measurements;
provide a set of robust signals as a function of position in the borehole, the robust signals including:
a ratio between Vzz coupling components at different spacing distances,
a ratio between Vxx and Vzz coupling components,
a ratio between Vyy and Vzz coupling components, and
a ratio between Vxx and Vyy coupling components; and
use the set of robust signals to determine a log of one or more formation parameters; and
generate a geosteering signal from the set of robust signals to direct a drill bit.

11. The system of claim 10, wherein the software further causes the at least one processor to display the set of robust signals in log form to a user.

12. The system of claim 10, wherein as part of said deriving or providing, the software causes the at least one processor to combine measurements associated with different spacing distances to obtain each of the robust signals.

13. The system of claim 12, wherein as part of said deriving or providing, the software further causes the at least one processor to employ measurements associated with different transmit antennas to ensure that the robust signals are compensated for instrumentation drift.

14. The system of claim 10, wherein as part of said deriving or providing, the software causes the at least one processor to use air-hang measurements for calibration of each of the robust signals.

15. The system of claim 10, wherein the tool is a logging while drilling tool having one or more tilted antennas.

16. The system of claim 10, wherein the tool is a wireline tool having at least one triad of orthogonal transmit antennas and at least one triad of orthogonal receive antennas.

17. The system of claim 10, wherein the set of robust signals includes an additional robust signal having a ratio between a sum of cross-coupling components Vxz+Vzx or Vyz+Vzy and a weighted or unweighted sum of orthogonal direct coupling components.

18. The system of claim 17, wherein the additional robust signal is expressible as $$S_5 = 1 + \frac{V_{xz} + V_{zx}}{\frac{1}{2}V_{xx} + \frac{1}{2}V_{yy} + V_{zz}}.$$

* * * * *